US006943920B2

(12) United States Patent
Edgar

(10) Patent No.: US 6,943,920 B2
(45) Date of Patent: Sep. 13, 2005

(54) METHOD, SYSTEM, AND SOFTWARE FOR SIGNAL PROCESSING USING PYRAMIDAL DECOMPOSITION

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 994 days.

(21) Appl. No.: 09/777,394

(22) Filed: Feb. 5, 2001

(65) Prior Publication Data

US 2001/0024531 A1 Sep. 27, 2001

Related U.S. Application Data

(60) Provisional application No. 60/180,031, filed on Feb. 3, 2000.

(51) Int. Cl.[7] .............................. H04N 1/409; G06T 5/00
(52) U.S. Cl. ....................... 358/3.26; 382/254; 382/260; 382/275
(58) Field of Search ............................... 358/3.26–3.27, 358/1.9, 463; 382/260–265, 266, 269, 254, 275

(56) References Cited

U.S. PATENT DOCUMENTS

| | | | |
|---|---|---|---|
| 2,404,138 A | 7/1946 | Mayer ........................... | 95/94 |
| 3,520,689 A | 7/1970 | Nagae et al. ................... | 96/55 |
| 3,520,690 A | 7/1970 | Nagae et al. ................... | 96/55 |
| 3,587,435 A | 6/1971 | Chioffe .......................... | 95/89 |

(Continued)

FOREIGN PATENT DOCUMENTS

| | | | | |
|---|---|---|---|---|
| EP | 0 261 782 A2 | 8/1987 | ............ | H04N/1/46 |
| EP | 0 422 220 A1 | 3/1989 | ............ | A61B/6/03 |
| EP | 0 482 790 B1 | 9/1991 | ............ | H04N/1/40 |

(Continued)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

"Adaptive-neighborhood filtering of images corrupted by signal-dependent noise", Rangayyan, R., et al., Applied Optics, vol. 37, No. 20, pp. 4477–4487, Jul. 10, 1998.

(Continued)

Primary Examiner—Scott A. Rogers
(74) Attorney, Agent, or Firm—Simon Galasso & Frantz, PLC

(57) ABSTRACT

A method, system, and software are disclosed for improving the quality of a signal. A base signal is recursively decomposed and modified for a desired number of pyramid levels. At each level, the decomposed signal from the previous level is modified to improve one or more signal components or characteristics. The modified signal from a given level is then decomposed for the next level of the pyramidal decomposition for each pyramid level. Starting at the second to last level of the pyramidal decomposition, the improved signal of the last pyramid level is recomposed and then combined with one or more signals from the current pyramid level, resulting in an improved signal for the current level. The recomposition and combination of the improved signal of the previous level occurs for each level until the top, or level 0, of the pyramidal decomposition is reached. The improved base signal may or may not be combined with the original base signal, depending on the desired outcome. The present invention finds particular application in photography and digital film processing, whereby the illustrated method may be used to improve image quality.

32 Claims, 11 Drawing Sheets

U.S. PATENT DOCUMENTS

| | | | | |
|---|---|---|---|---|
| 3,615,479 | A | 10/1971 | Kohler et al. | 96/48 |
| 3,615,498 | A | 10/1971 | Aral | 96/55 |
| 3,617,282 | A | 11/1971 | Bard | 96/59 |
| 3,747,120 | A | 7/1973 | Stemme | 346/75 |
| 3,833,161 | A | 9/1974 | Krumbein | 226/92 |
| 3,903,541 | A | 9/1975 | Von Meister et al. | 354/317 |
| 3,946,398 | A | 3/1976 | Kyser et al. | 346/1 |
| 3,959,048 | A | 5/1976 | Stanfield et al. | 156/94 |
| 4,026,756 | A | 5/1977 | Stanfield et al. | 156/554 |
| 4,081,577 | A | 3/1978 | Horner | 427/424 |
| 4,142,107 | A | 2/1979 | Hatzakis et al. | 250/571 |
| 4,215,927 | A | 8/1980 | Grant et al. | 354/317 |
| 4,249,985 | A | 2/1981 | Stanfield | 156/554 |
| 4,265,545 | A | 5/1981 | Slaker | 356/431 |
| 4,301,469 | A | 11/1981 | Modeen et al. | 358/75 |
| 4,490,729 | A | 12/1984 | Clark et al. | 346/75 |
| 4,501,480 | A | 2/1985 | Matsui et al. | 354/298 |
| 4,564,280 | A | 1/1986 | Fukuda | 354/317 |
| 4,594,598 | A | 6/1986 | Iwagami | 346/140 |
| 4,621,037 | A | 11/1986 | Kanda et al. | 430/30 |
| 4,623,236 | A | 11/1986 | Stella | 354/318 |
| 4,633,300 | A | 12/1986 | Sakai | 358/41 |
| 4,636,808 | A | 1/1987 | Herron | 346/75 |
| 4,666,307 | A | 5/1987 | Matsumoto et al. | 356/404 |
| 4,670,779 | A | 6/1987 | Nagano | 358/75 |
| 4,736,221 | A | 4/1988 | Shidara | 354/317 |
| 4,741,621 | A | 5/1988 | Taft et al. | 356/376 |
| 4,745,040 | A | 5/1988 | Levine | 430/21 |
| 4,755,844 | A | 7/1988 | Tsuchiya et al. | 354/317 |
| 4,777,102 | A | 10/1988 | Levine | 430/21 |
| 4,796,061 | A | 1/1989 | Ikeda et al. | 355/73 |
| 4,814,630 | A | 3/1989 | Lim | 250/578 |
| 4,821,114 | A | 4/1989 | Gebhardt | 358/75 |
| 4,845,551 | A | 7/1989 | Matsumoto | 358/80 |
| 4,851,311 | A | 7/1989 | Millis et al. | 430/30 |
| 4,857,430 | A | 8/1989 | Millis et al. | 430/30 |
| 4,875,067 | A | 10/1989 | Kanzaki et al. | 354/325 |
| 4,969,045 | A | 11/1990 | Haruki et al. | 358/228 |
| 4,994,918 | A | 2/1991 | Lingemann | 358/214 |
| 5,016,104 | A * | 5/1991 | Lim | 358/463 |
| 5,027,146 | A | 6/1991 | Manico et al. | 354/299 |
| 5,034,767 | A | 7/1991 | Netz et al. | 354/317 |
| 5,101,286 | A | 3/1992 | Patton | 358/487 |
| 5,124,216 | A | 6/1992 | Giapis et al. | 430/30 |
| 5,155,596 | A | 10/1992 | Kurtz et al. | 358/214 |
| 5,196,285 | A | 3/1993 | Thomson | 430/30 |
| 5,200,817 | A | 4/1993 | Birnbaum | 358/80 |
| 5,212,512 | A | 5/1993 | Shiota | 354/319 |
| 5,231,439 | A | 7/1993 | Takahashi et al. | 354/313 |
| 5,235,352 | A | 8/1993 | Pies et al. | 346/140 |
| 5,255,408 | A | 10/1993 | Blackman | 15/308 |
| 5,266,805 | A | 11/1993 | Edgar | 250/330 |
| 5,267,030 | A | 11/1993 | Giorgianni et al. | 358/527 |
| 5,292,605 | A | 3/1994 | Thomson | 430/30 |
| 5,296,923 | A | 3/1994 | Hung | 358/527 |
| 5,334,247 | A | 8/1994 | Columbus et al. | 118/411 |
| 5,350,651 | A | 9/1994 | Evans et al. | 430/21 |
| 5,350,664 | A | 9/1994 | Simons | 430/362 |
| 5,357,307 | A | 10/1994 | Glanville et al. | 354/324 |
| 5,360,701 | A | 11/1994 | Elton et al. | 430/501 |
| 5,371,542 | A | 12/1994 | Pauli et al. | 348/262 |
| 5,391,443 | A | 2/1995 | Simons et al. | 430/21 |
| 5,414,779 | A | 5/1995 | Mitch | 382/199 |
| 5,416,550 | A | 5/1995 | Skye et al. | 354/298 |
| 5,418,119 | A | 5/1995 | Simons | 430/507 |
| 5,418,597 | A | 5/1995 | Lahcanski et al. | 355/76 |
| 5,432,579 | A | 7/1995 | Tokuda | 354/293 |
| 5,436,738 | A | 7/1995 | Manico | 358/503 |
| 5,440,365 | A | 8/1995 | Gates et al. | 354/298 |
| 5,447,811 | A | 9/1995 | Buhr et al. | 430/20 |
| 5,448,380 | A | 9/1995 | Park | 358/520 |
| 5,452,018 | A | 9/1995 | Capitant et al. | 348/651 |
| 5,465,155 | A | 11/1995 | Edgar | 358/500 |
| 5,477,345 | A | 12/1995 | Tse | 358/500 |
| 5,496,669 | A | 3/1996 | Pforr et al. | 430/22 |
| 5,516,608 | A | 5/1996 | Hobbs et al. | 430/30 |
| 5,519,510 | A | 5/1996 | Edgar | 358/471 |
| 5,546,477 | A | 8/1996 | Knowles et al. | 382/242 |
| 5,550,566 | A | 8/1996 | Hodgson et al. | 345/202 |
| 5,552,904 | A | 9/1996 | Ryoo et al. | 358/518 |
| 5,563,717 | A | 10/1996 | Koeng et al. | 358/406 |
| 5,568,270 | A | 10/1996 | Endo | 358/298 |
| 5,576,836 | A | 11/1996 | Sano et al. | 358/302 |
| 5,581,376 | A | 12/1996 | Harrington | 358/518 |
| 5,587,752 | A | 12/1996 | Petruchik | 396/315 |
| 5,596,415 | A | 1/1997 | Cosgrove et al. | 358/296 |
| 5,627,016 | A | 5/1997 | Manico | 430/434 |
| 5,649,260 | A | 7/1997 | Wheeler et al. | 396/569 |
| 5,664,253 | A | 9/1997 | Meyers | 396/603 |
| 5,664,255 | A | 9/1997 | Wen | 396/627 |
| 5,667,944 | A | 9/1997 | Reem et al. | 430/359 |
| 5,678,116 | A | 10/1997 | Sugimoto et al. | 396/611 |
| 5,691,118 | A | 11/1997 | Haye | 430/357 |
| 5,695,914 | A | 12/1997 | Simon et al. | 430/379 |
| 5,698,382 | A | 12/1997 | Nakahanada et al. | 430/418 |
| 5,726,773 | A | 3/1998 | Mehlo et al. | 358/474 |
| 5,739,897 | A | 4/1998 | Frick et al. | 355/40 |
| 5,771,107 | A | 6/1998 | Fujimoto et al. | 358/464 |
| 5,790,277 | A | 8/1998 | Edgar | 358/487 |
| 5,835,795 | A | 11/1998 | Craig et al. | 396/6 |
| 5,835,811 | A | 11/1998 | Tsumura | 396/598 |
| 5,870,172 | A | 2/1999 | Blume | 355/27 |
| 5,880,819 | A | 3/1999 | Tanaka et al. | 355/75 |
| 5,892,595 | A | 4/1999 | Yamakawa et al. | 358/530 |
| 5,930,388 | A | 7/1999 | Murakami et al. | 382/167 |
| 5,959,720 | A | 9/1999 | Kwon et al. | 355/38 |
| 5,963,662 | A | 10/1999 | Vachtsevanos et al. | 382/150 |
| 5,966,465 | A | 10/1999 | Keith et al. | 382/232 |
| 5,979,011 | A | 11/1999 | Miyawaki et al. | 15/308 |
| 5,982,936 | A | 11/1999 | Tucker et al. | 382/233 |
| 5,982,937 | A | 11/1999 | Accad | 382/239 |
| 5,982,941 | A | 11/1999 | Loveridge et al. | 382/260 |
| 5,982,951 | A | 11/1999 | Katayama et al. | 382/284 |
| 5,988,896 | A | 11/1999 | Edgar | 396/604 |
| 5,991,444 | A | 11/1999 | Burt et al. | 382/232 |
| 5,998,109 | A | 12/1999 | Hirabayashi | 430/434 |
| 6,000,284 | A | 12/1999 | Shin et al. | 73/150 |
| 6,005,987 | A | 12/1999 | Nakamura et al. | 382/294 |
| 6,065,824 | A | 5/2000 | Bullock et al. | 347/19 |
| 6,069,714 | A | 5/2000 | Edgar | 358/487 |
| 6,088,084 | A | 7/2000 | Nishio | 355/75 |
| 6,089,687 | A | 7/2000 | Helterline | 347/7 |
| 6,101,273 | A | 8/2000 | Matama | 382/169 |
| 6,102,508 | A | 8/2000 | Cowger | 347/7 |
| 6,137,965 | A | 10/2000 | Burgeios et al. | 396/626 |
| 6,200,738 | B1 | 3/2001 | Takano et al. | 430/362 |

FOREIGN PATENT DOCUMENTS

| | | | | |
|---|---|---|---|---|
| EP | 0 525 886 A3 | 7/1992 | | G03D/5/00 |
| EP | 0 580 293 A1 | 1/1994 | | H04N/1/04 |
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |
| WO | WO 98/19216 | 5/1998 | | G03C/5/29 |

| | | | |
|---|---|---|---|
| WO | WO 98/25399 | 6/1998 | ............ H04N/1/38 |
| WO | WO 98/31142 | 7/1998 | .......... H04N/5/253 |
| WO | WO 98/34157 | 8/1998 | |
| WO | WO 98/34397 | 8/1998 | |
| WO | WO 99/43148 | 8/1999 | ............ H04N/1/00 |
| WO | WO 99/43149 | 8/1999 | ............ H04N/1/00 |
| WO | WO 01/01197 | 1/2001 | ............ G03D/5/00 |
| WO | WO 01/13174 A1 | 2/2001 | ............ G03D/5/06 |
| WO | WO 01/45042 A1 | 6/2001 | ............. G06T/5/00 |
| WO | WO 01/50192 A1 | 7/2001 | ........... G03C/7/407 |
| WO | WO 01/50193 A1 | 7/2001 | ........... G03C/7/407 |
| WO | WO 01/50194 A1 | 7/2001 | ........... G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp.886–890, 1998.

"Low–Cost Display Assembly and Interconnect Using Ink–Jet Printing Technology", Hayes, D. et al., Display Works '99, MicroFab Technologies, Inc., pp 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Equipment White Papers", Putting Damaged Film on ICE, www.nikonusa.com/reference/whitepapers/imaging, Nikon Corporation, Nov. 28, 2000.

* cited by examiner

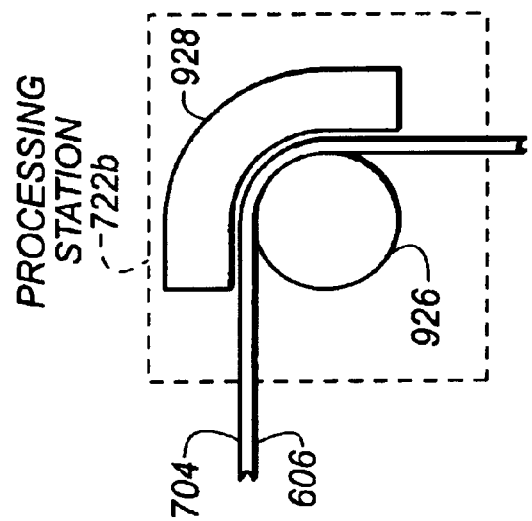
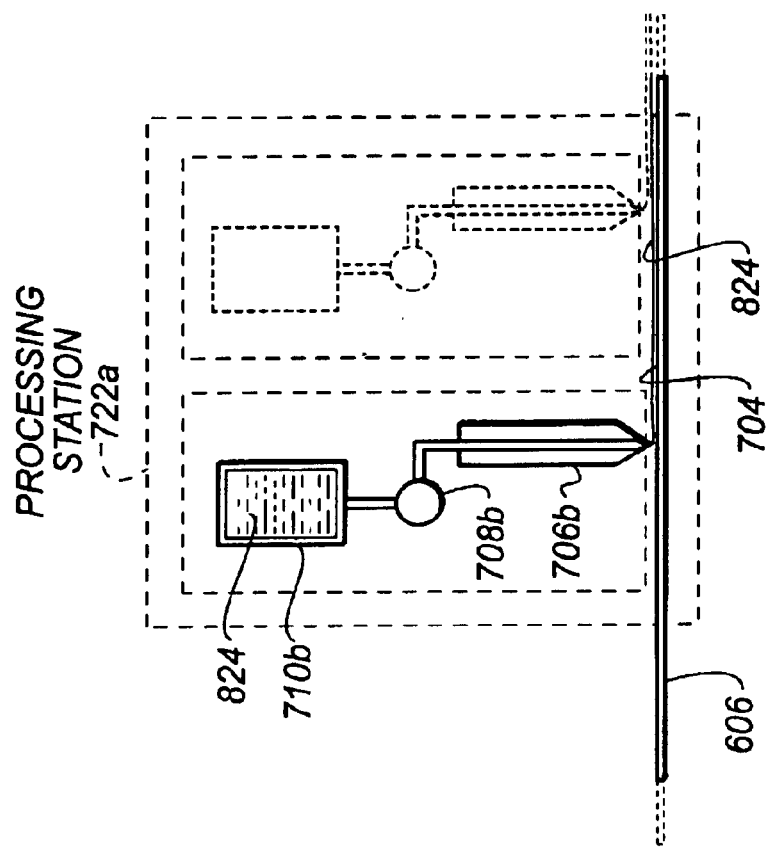

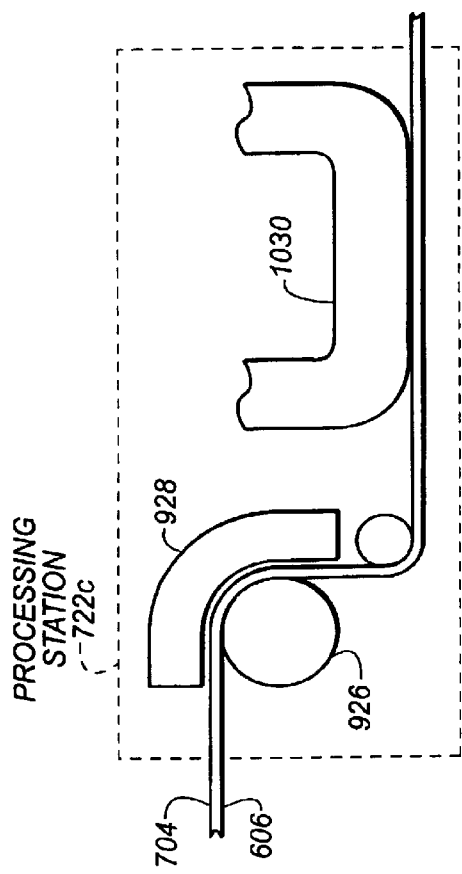
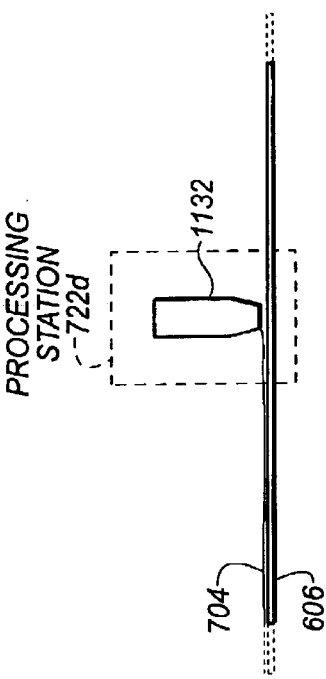

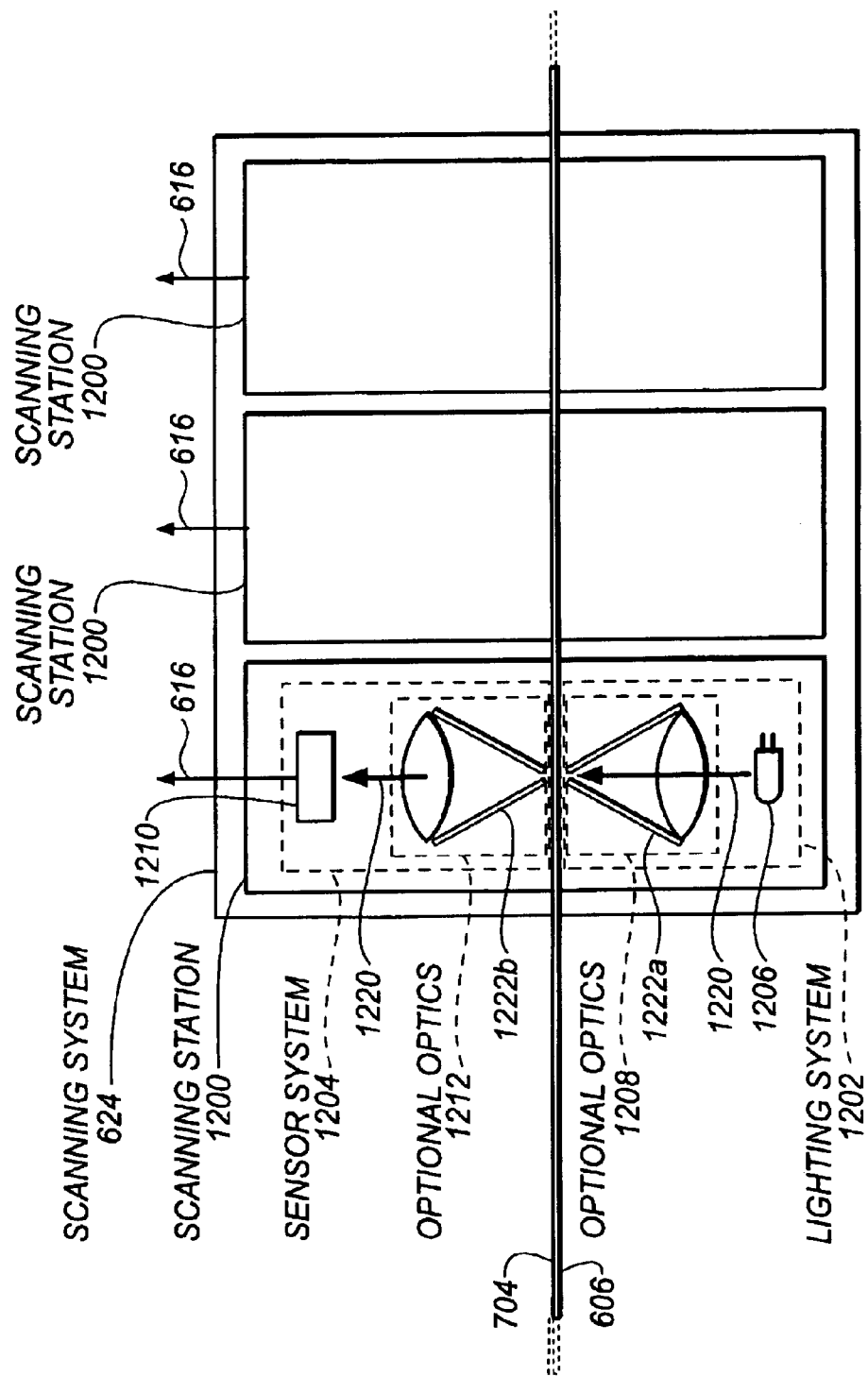

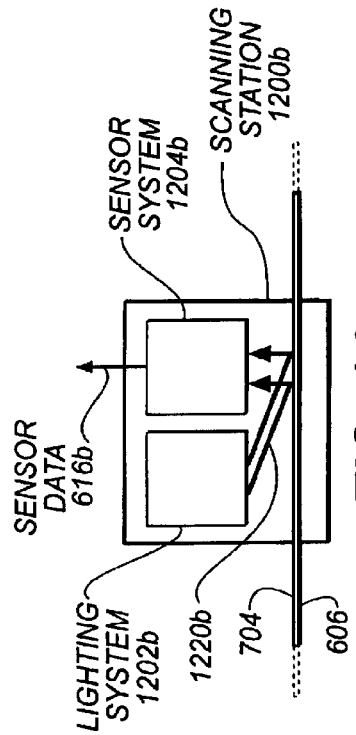
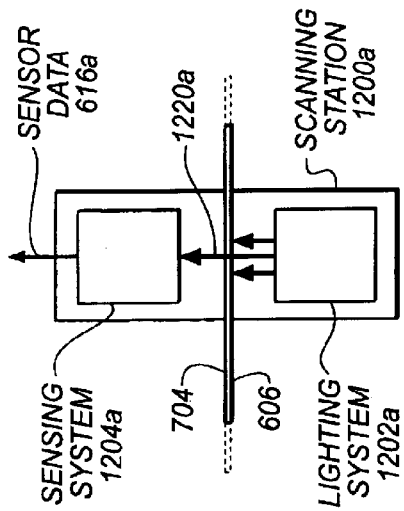
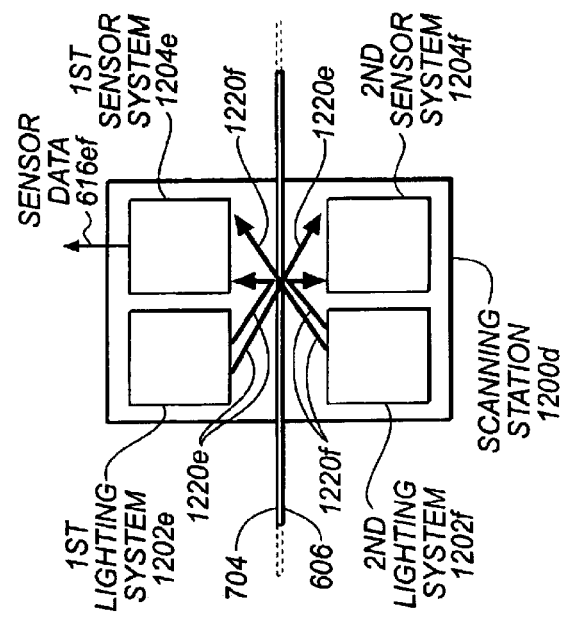
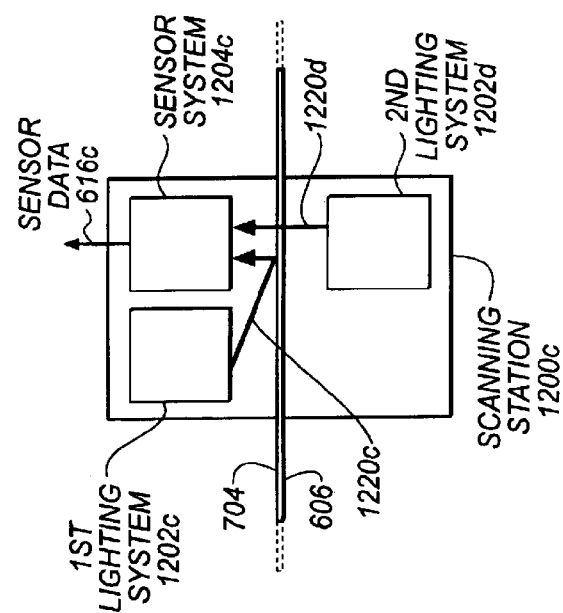

METHOD, SYSTEM, AND SOFTWARE FOR SIGNAL PROCESSING USING PYRAMIDAL DECOMPOSITION

CROSS REFERENCE TO RELATED APPLICATIONS

This application claims the benefit of U.S. Patent Application Ser. No. 60/180,031 filed Feb. 3, 2000 entitled "Pyramiding in Signal Processing System and Method," of common assignee herewith.

This application is related to U.S. patent application Ser. No. 60/180,036, entitled "Match Blur System and Method"; and U.S. patent application Ser. No. 60/180,030, entitled "Reducing Streaks in Scanning," each of the same inventor hereof and those respective applications are incorporated herein. This application is also related to U.S. patent application Ser. No. 09/255,401 entitled "Parametric Image Stitching", filed on Feb. 22, 1999, and Ser. No. 09/247,264 entitled "Image Block Windowed Blending", filed on Feb. 10, 1999.

FIELD OF THE INVENTION

The present invention relates generally to signal processing and more particularly to using pyramidal decomposition.

BACKGROUND OF THE INVENTION

A frequent goal of signal processing is to improve the quality, or the fidelity, of a captured signal to the information it represents by reducing noise in the signal. For example, recorded audio signals are often processed to remove noise and undesirable signal components to create an audio signal much more similar to the original sound that was recorded. However, conventional methods used to reduce noise are ineffective or slow. In some methods, the level of noise reduction is unsatisfactory. In other methods, the reduction of noise is destructive and removes a significant amount of desired information from the signal. In addition, many of these methods require an excessive amount of processing time to perform, tying up processing resources.

These conventional noise filtering methods are often utilized in digital imaging applications, such as photographic film digitization, to reduce noise caused by film grain or noise introduced by the image capturing equipment. Many conventional noise filtering methods for images utilize blurring of the base image to reduce noise. However, the use of blurring on the base image often causes a degradation of detail, as the edges are blurred. To prevent a significant loss of detail, conventional image noise reduction methods reduce the level of noise reduction, thereby diminishing the effectiveness of the blurring process. The conventional blurring methods can also require relatively extensive processing as the base image is processed at the base resolution.

Given the drawbacks in current noise reduction methods, it is clear that conventional methods are less than perfect.

SUMMARY OF THE INVENTION

Therefore, what is needed is a method for improved noise reduction. Accordingly, the present invention provides a method comprising obtaining a base signal having a plurality of signal components and performing a pyramidal decomposition of the base signal to generate a first decomposed signal. A ratio of a desired signal component of the first decomposed signal to other signal components of the first decomposed signal is increased to generate a first modified signal. The method further comprising recomposing the first modified signal to generate an improved base signal. In other embodiments, the method further comprising performing a pyramidal decomposition of the first modified signal to generate a second decomposed signal, increasing the ratio of a desired signal component to other signal components of the second decomposed signal to generate a second modified signal, and recomposing the modified second decomposed signal to generate a first recomposed signal. In another embodiment, the method further comprising combining the first recomposed signal with the second modified signal to generate a first improved signal.

Another embodiment of the present invention provides for a method comprising obtaining a digital base image having a plurality of image components, performing a first pyramidal decomposition of the base image to generate a first decomposed image. The method further comprising increasing the ratio of a desired image component to the other image components of the first decomposed image to generate a first modified image. The method additionally comprising performing a pyramidal decomposition of the first modified image to generate a second decomposed image and increasing the ratio of a desired image component to other image components of the second decomposed image to produce a second modified image. The method further comprising recomposing the second modified image to generate a first recomposed image, combining the first recomposed image with the first modified image to generate an improved first image, and recomposing the improved first image to generate an improved base image.

In another embodiment of the present invention, a digital film development system is provided. The digital film development system comprises a film processing system and a data processing system. The film processing system includes an image capturing station capable of obtaining sets of data representing an image formed in film. The data processing system includes: a processor; memory; and a program of instructions capable of being stored in the memory and executed by the processor. The program of instructions includes instructions for obtaining a base signal having a plurality of signal components and performing a pyramidal decomposition of the base signal to generate a first decomposed signal. The program of instructions additionally includes instructions for increasing the ratio of a desired signal component to the other signal components of the fist decomposed signal to generate a first modified signal, and recomposing the first modified signal to generate an improved base signal. In other embodiments, the program of instructions further includes instructions for performing a pyramidal decomposition of the first modified signal to generate a second decomposed signal, increasing the ratio of a desired signal component of the second decomposed signal to other signal components of the second decomposed signal to generate a second modified signal, and recomposing the modified second decomposed signal to generate a first recomposed signal. In another embodiment, the program of instructions further includes instructions for combining the first recomposed signal with the second modified signal to generate a first improved signal.

In another embodiment of the present invention, a digital image tangibly embodied in a computer readable medium is provided. The digital image is generated according to a method comprising obtaining a digital base image having a plurality of image components, performing a first pyramidal decomposition of the base image to generate a first decomposed image. The method further comprising increasing the ratio of a desired image component to the other image components of the first decomposed image to generate a first modified image. The method additionally comprising performing a pyramidal decomposition of the first modified image to generate a second decomposed image and increasing the ratio of a desired image component to other image components of the second decomposed image to produce a second modified image. The method further comprising recomposing the second modified image to generate a first recomposed image, combining the first recomposed image with the first modified image to generate an improved first image, and recomposing the improved first image to generate an improved base image.

An advantage of at least one embodiment of the present invention is that unwanted noise in a signal is reduced without reducing the desired portion of the signal.

An additional advantage of at least one embodiment of the present invention is that signal quality is improved for a desired signal component without degrading a other desired signal components.

Yet another advantage of at least one embodiment of the present invention is that calculations to improve signal quality can be performed relatively quickly, due to a lower processing overhead and less user intervention than conventional methods.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 8 is a block diagram illustrating another embodiment of the development system, as shown in FIG. 6, according to at least one embodiment of the present invention;

FIGS. 9 through 11 are block diagrams illustrating various embodiments of a processing station, as shown in FIG. 8, according to at least one embodiment of the present invention;

FIG. 12 is a block diagram illustrating a scanning system, as shown in FIG. 6, according to at least one embodiment of the present invention; and FIGS. 13 through 16 are block diagrams illustrating various embodiments of a scanning station, as shown in FIG. 12, according to at least one embodiment of the present invention.

DETAILED DESCRIPTION OF AN EMBODIMENT OF THE INVENTION

FIGS. 1–16 illustrate a method, system, and software for pyramidal decomposition of a base signal to improve one or more components of the base signal. The base signal is decomposed into a first decomposed signal of a lesser resolution. The decomposed signal of the first level is modified to improve a signal component or characteristic of the decomposed signal, such as the signal-to-noise ratio, resulting in a modified signal for the first pyramid level. The modified signal for the first pyramid level is decomposed and modified at a second level, resulting in a modified signal for the second pyramid level. The remaining pyramidal levels are recursively decomposed and modified as in the first and second level. At the lowest desired pyramid level, the lowest modified signal is combined with one or more signals from the second lowest pyramid level, resulting in an improved decomposed signal at the second lowest level. The results of the combination are recomposed and then combined with one or more signals from the third lowest pyramid level, resulting in an improved decomposed signal at the third lowest level. At each level of the desired number of pyramid levels, the one or more signals associated with a given level are combined with the improved signal of the previous lower level. This occurs for each level until an improved signal is produced at level 0, or the top or beginning of the pyramidal decomposition. At level 0, the improved signal can be combined with the base signal or left uncombined, depending on the desired outcome. As a result of the recursive pyramidal decomposition, modification, combination, and recomposition at each level, an improved base signal having improved quality results at level 0, Note that the pyramidal decomposition method, as described above, may also be applied to only one level of decomposition.

Figure 1:
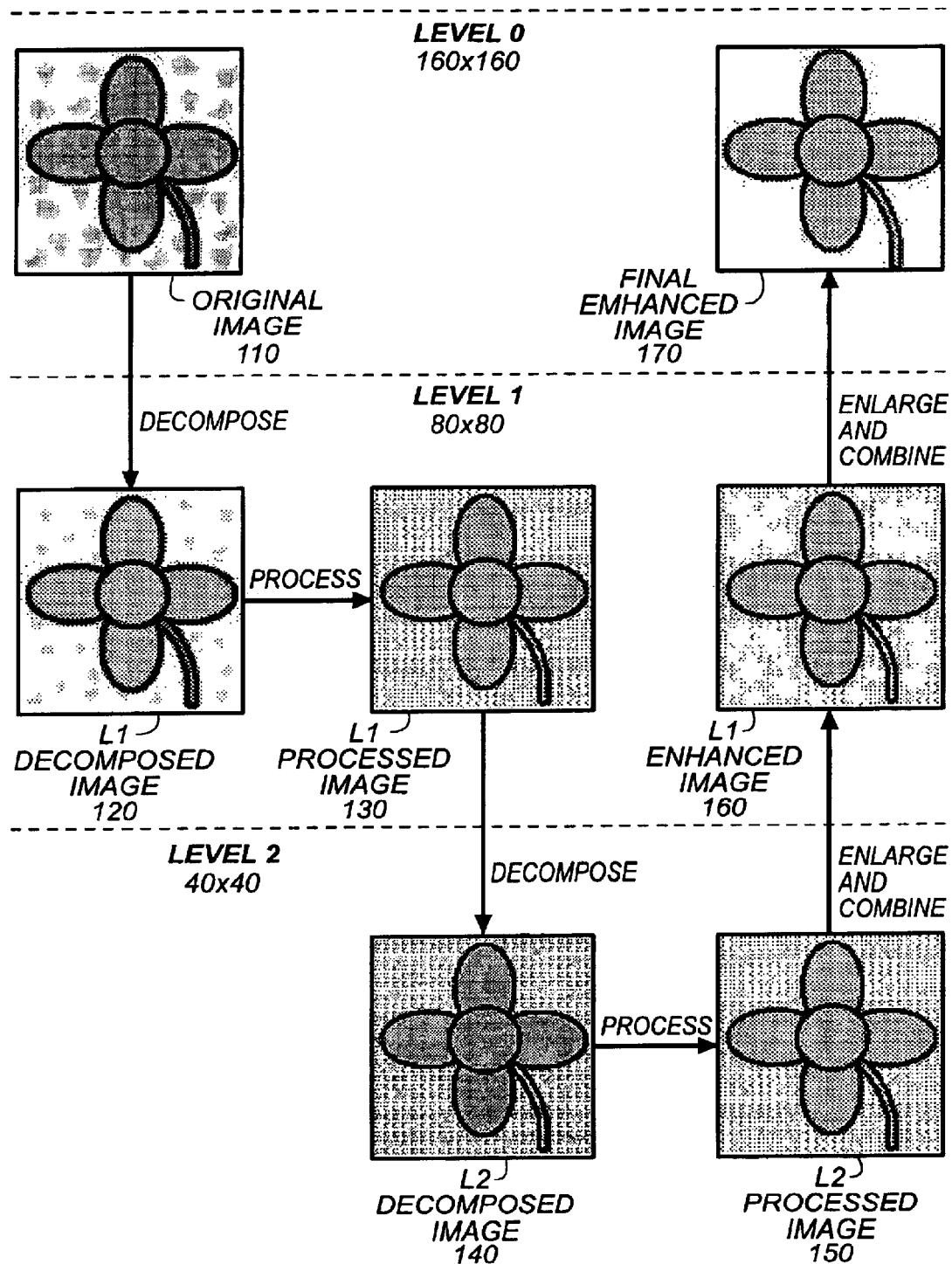
FIG. 1 is a pictorial diagram demonstrating a method of for image improvement according to at least one embodiment of the present invention.

Referring now to FIG. 1, an illustration demonstrating a method of using pyramidal decomposition to improve an image is discussed according to at least one embodiment of the present invention. Base image 110 is a visual representation of a data set resulting from the capture of a base signal (the image). For example, base image 110 may represent an image captured in photographic film, on X-ray film, one or more frames of a video film, an infrared image captured by a satellite, etc.

In at least one embodiment, base image 110 contains undesirable information, such as specks in the background and noise located in the foreground of base image 110. The capture and processing of signals often results in unwanted information manifesting itself in the captured signal. For example, "noise", in a variety of forms, often appears in captured signals and their digital representations. Noise can often refer to a disturbance that obscures or reduces the clarity of a signal, such as white noise introduced by transmission of a signal. Noise, as used herein, can also refer to any extraneous signal components, or signal components other than one or more desired components, that may interfere with the capture, processing, and or representation of the one or more desired components. For example, noise could refer to green information (an extraneous or undesired signal component) in a red color channel (a desired signal component) of an image, or static (undesired signal component) introduced into the wireless broadcast of television signal (desired signal component).

L1 decomposed image 120 represents a decomposition or downsampling of base image 110 from a resolution of 160×160 pixels to 80×80 pixels, resulting in L1 decomposed image 120 having one-fourth of the information as base image 110. L1 decomposed image 120 is then modified or altered resulting in L1 modified image 130. In at least one embodiment, the modification process performed on L1 decomposed image 120 improves image quality by reducing noise, as described in greater detail herein.

L1 modified image 130 is decomposed, resulting in L2 decomposed image 140. L2 decomposed image 140, in this example having a resolution of 40×40 pixels, has one fourth of the information of L1 decomposed image 120 and one sixteenth of the information in base image 110. L2 decomposed image 140 is then modified, using the same or different one or more modification processes performed on L1 modified image 130, resulting in L2 modified image 150. In one embodiment, L2 modified image 150 is then reconstructed to a resolution of 80×80 pixels using an appropriate method and combined with either L1 decomposed image 120 or L1 modified image 130, or both, according to the desired outcome. The result of the reconstruction and combination of L1 modified image 150 is L1 improved image 160.

L1 improved image 160 is reconstructed to a resolution of 160×160 pixels and, in one embodiment, combined with base image 110, resulting in improved base image 170. In other embodiments, L1 improved image 160 is reconstructed and not combined with base image 110. Improved base image 170, in at least one embodiment, has improved quality by reducing undesirable or extraneous noise from base image 110. Note that although only two levels of pyramidal decomposition (Level 1 and Level 2) are illustrated in FIG. 1, base image 110 may be decomposed for any desired or predetermined number of levels. For example, base image 110, with a resolution of 160×160 pixels, could be decomposed by a factor of 2 for a desired number of 4 levels of decomposition, resulting in decomposed images with resolutions of 80×80, 40×40, 20×20, and 10×10 pixels for levels 1, 2, 3, and 4 respectively. It will be appreciated that although a decomposition factor of 2 has been illustrated, other embodiments include other decomposition factors as appropriate. It will also be appreciated that different decomposition factors may be used between levels.

Although the above description involved the pyramidal decomposition and improvement of one or more image components, the present invention may also be applied to other signals. For example, in one embodiment, the base signal may be represented by a base analog signal emanating from a cellular phone, where the base analog signal contains considerable static. In this example, the static is the undesired or extraneous signal component and the caller's voice, represented by the an analog signal component of the base signal, is the desired component. In this example, the base signal could be decomposed into a first decomposed signal, the first decomposed signal filtered to reduce static and decomposed again, and so on, and then the filtered signals at each pyramid level could be combined, resulting in an improved analog signal with a higher ratio of desired signal component (the caller's voice) to undesired signal component (static).

The term "signal," as used herein, can refer to a captured or recorded representation of an environmental phenomenon, such as one or more images captured on film or by digital camera, a recorded audio signal recorded on magnetic media, a electrical analog signal transmitted over a wire, and the like. Although various types of signals may be processed according to the present invention, the processing of a data representative of a captured image will be discussed for clarity and ease of discussion. It will be appreciated that the methods illustrated herein may also be applied to other types of signals and their representative forms, such as processing an audio signal to produce an audio signal with improved fidelity.

Figure 2:
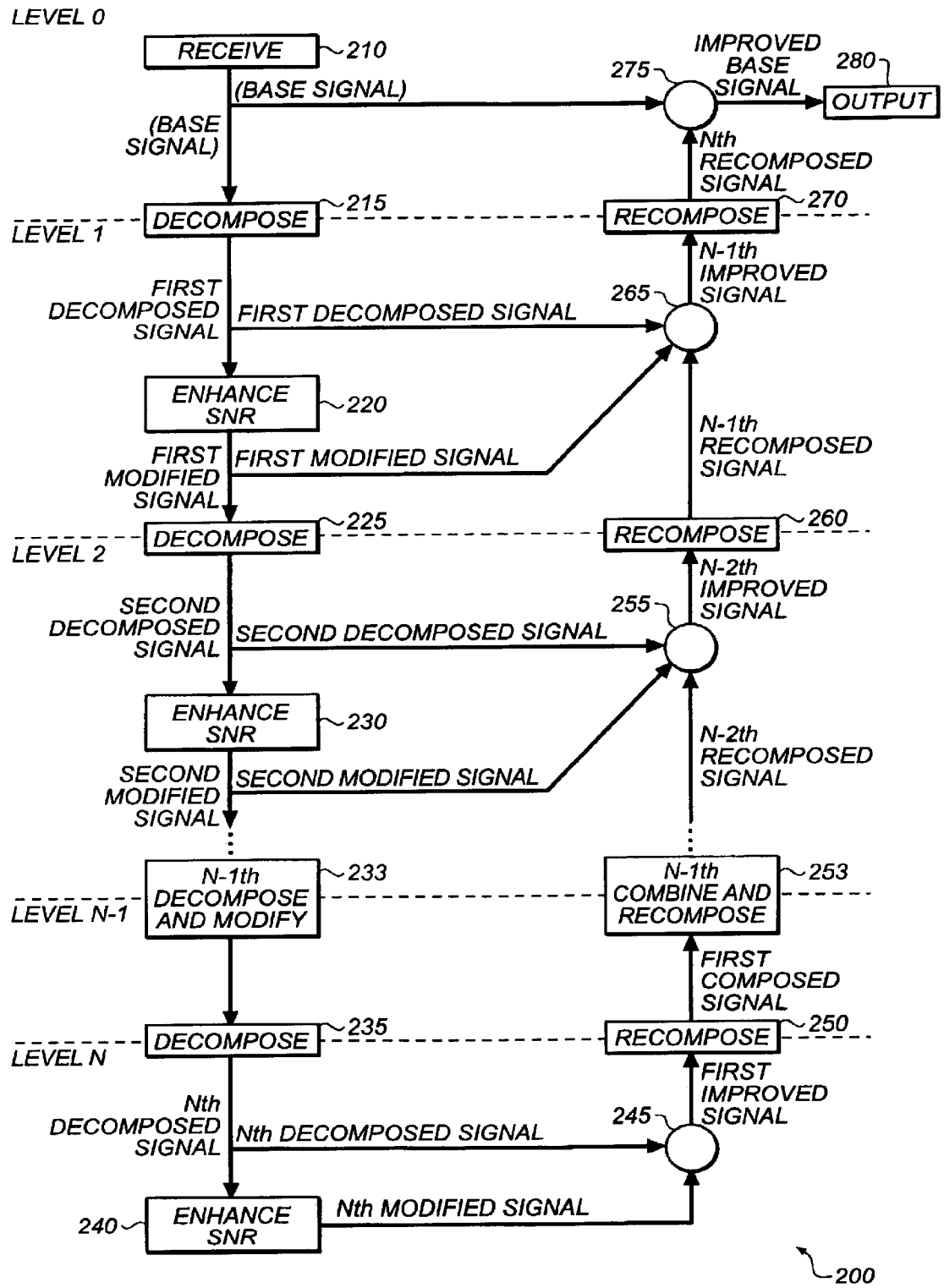
FIG. 2 is a flow diagram illustrating a method for signal improvement using pyramidal decomposition according to at least one embodiment of the present invention.

Referring next to FIG. 2, a method for pyramidal decomposition and improvement of a signal is illustrated, and referred to generally as pyramidal decomposition method 200. Pyramidal decomposition method 200 commences in step 210, where a base signal, such as base image 110 (FIG. 1) is received or recorded and converted into a form appropriate for processing. In at least one embodiment, the base signal is an analog signal and conversion of the base analog signal includes digitizing the signal into one or more digital data sets representative of the base image. For example, a sound wave is captured by a microphone and converted to an electrical analog signal (the base signal). The microphone is connected to a analog-to-digital (A/D) converter, which converts the analog signal to a digital signal. The digital signal is then saved as a digital data set or file on a storage medium by a data processor. In another example, an image may be recorded on photographic film. In this case, the step of conversion can include placing the film in a film scanner or digital film development system and scanning the film to produce one or more digital data sets representing one or more layers of the film.

In other embodiments, the base signal has already been digitized, such as an image stored on a digital camera. In this embodiment, step 210 can include the steps of receiving the digital data representing the signal and/or storing the digital data to a storage medium, such as a hard disk or memory, where it may be accessed later. Step 210 can also include the step of converting the digital data from one form to another appropriate form, such as converting a bitmap image file to a Joint Photographic Experts Group (JPEG) image file. It will be appreciated that other methods of obtaining and preparing a base signal for processing, either by a digital or analog system, may be used without departing from the spirit or the scope of the present invention.

In step 215, the base signal is decomposed into a first decomposed signal at the level one of the pyramidal decomposition process. A variety of decomposition methods may be utilized, such as sampling or decimation. In embodiments where the base signal includes an image and is converted to a pixel based data set, the resolution of the image may also be decomposed or reduced by discarding a certain number of pixels. In at least one embodiment, the base signal is decomposed by a factor of n, where n is a real number. For example, the resolution of an image (the base signal) could be reduced in half (n=2) in step 215. It will be appreciated that the factor n could be determined by a user, by analysis of the image, by empirical determination, and the like.

In step 220, in at least one embodiment, the first decomposed signal is modified to reduce a signal-to-noise ratio for a desired signal component of the base signal and/or the first decomposed signal, resulting in a first modified signal. The term "signal-to-noise ratio (SNR)," as used herein, refers to the ratio of the amount of information associated with one or more desired signal components to the sum amount of information associated with one or more extraneous or undesired signal components. The SNR of a signal can be determined using a variety of techniques, such as a subjective determination by a user, measurement using electronic equipment, application of a mathematical algorithm to the digital data representative of a signal, and the like.

The SNR of a decomposed signal can be improved (increased) using a number of methods. In one embodiment, the SNR is improved by filtering part or all of the decomposed signal. In this embodiment, various types of filtering appropriate to the signal type and the desired outcome of the filtering. For example, if the signal is an image (the desired signal component) and noise (an undesired signal component) is present, different blurring processes maybe applied to reduce or eliminate the noise, such as a Gaussian blur, a match blur as detailed in related U.S. Provisional Patent Application No. 60/180,036, entitled "Match Blur System and Method."), and the like. In another embodiment, step 220 includes removing defects in the signal. In images, for example, interference caused by dust and scratches on a photograph during scanning, magenta stains, and/or streaks can be removed by various processes.

In one embodiment, a sheep and shepherd method is used to modify the first decomposed image to generate a first modified image in step 220. As described in greater detail herein, a shepherd artifact is a component of a signal having a high SNR for a first set of one or more desired properties but a low SNR for a second set of one or more different desired properties. A sheep artifact is a component of the signal having a low SNR for the first set of desired properties, but having a high SNR for the second set of desired properties. In the sheep and shepherd method, the shepherd artifact is used to guide the sheep artifact, resulting in a guided artifact having a high SNR for both the first and second set of desired properties. As an example of an implementation of a signal-to-noise ratio for sheep and shepherd artifacts, using an image as the signal, if the image has considerable edge information or detail (desirable signal component) but relatively less intensity information (extraneous signal component) in relation, the image could be said to have a relatively high SNR (or quality) for edge content. Conversely, if intensity information is the desired signal component and edge content is the extraneous signal component, the image could be said to have a relatively low SNR (or quality) for color intensity. In this example, the artifact could be considered a sheep artifact if the guiding property is color intensity, since the SNR of the artifact is relatively low. Likewise, the artifact could be considered a shepherd artifact if the guiding property or category is sharpness or detail. The use of sheep and shepherd method as used in at least one embodiment of the present invention will be discussed subsequently with reference to FIGS. 3, 4, and 5.

Since noise and/or defects, as the undesired component, are reduced or eliminated from the decomposed signal while the remainder of the information in the decomposed image remains, it can be said that the signal-to-noise ratio for signal information of the first improved signal increased. Since an increase in the signal-to-noise ratio of a desired property of the first improved signal is increased, the first improved signal can be said to have improved quality. It will be appreciated that a plurality of methods may be employed to alter the SNR of the first decomposed signal. For example, the first decomposed signal could be filtered to remove streaks, then blurred to remove noise, and then modified using a sheep and shepherd method to improve signal contrast.

In at least one embodiment, the pyramidal decomposition process is applied for a plurality of pyramid levels. For clarity, the term N will refer to the number of levels of decomposition, with level 0 being the top or the undecomposed base signal and N referring to the last level of pyramidal decomposition. In step 233, steps of decomposing and modifying, as discussed in steps 225 and 230, can be repeated for levels 3 through N–1, producing a third decomposed signal, a third modified signal, a fourth decomposed signal, a fourth modified signal, and so on, until a N–1th decomposed signal and a N–1th modified signal are produced. In steps 235 and 240, a Nth decomposed signal and a Nth modified signal are produced, as discussed in steps 225 and 230, at the lowest level (level N) of the pyramidal decomposition. It will be appreciated that the decomposition factor n, discussed previously, may be the same for each level of decomposition, or the factor n may change in value between levels.

In step 245, in one embodiment, one or more signals from level N may be combined if appropriate to produce a first improved signal. Combination methods can include, but are not limited to, image stitching, multiplication, subtraction, overlay, and the like. For example, if the N level signals are images, the Nth decomposed image (signal) produced by step 235 could be blurred in step 240 to produce the Nth modified image (signal). The Nth decomposed image could be subtracted from the Nth modified image to create a mask. This mask could then be applied at the N–1 level to one or more of the N–1th images. Alternately, for certain signal processing applications, there may not be any benefit to combining the Nth level signals, so step 245 in one embodiment is omitted. For ease of discussion, the Nth modified signal will also be referred to as the first improved signal even when step 245 is excluded.

In step 250, the first improved signal is recomposed into a first recomposed signal using an appropriate recomposition method, such as interpolation or upsampling. In the case where the Nth modified signal is an image, the Nth modified signal may be recomposed using a variety of pixel interpolation methods, such as bicubic and bilinear interpolation. The nearest neighbor algorithm may also be used, but it will be appreciated that this method may produce undesirable results. In at least one embodiment, a recomposition factor r, where r is a real number, correlating to decomposition factor n for the common level is used to determine the resolution increase. For example, if a decomposition factor n having a value of two was used to decompose a image (signal) on the first level of the pyramidal decomposition method, the correlated recomposition factor f has a value of two for the for the same level in this case. Alternately, in another embodiment, the recomposition factor f may be different from the correlated decomposition level n at a given level.

The combination and recomposition steps, as discussed in steps 245 and 250, may be repeated in step 253 for level N–1 to level 2 if the pyramidal decomposition method includes more than two levels, resulting in a second improved signal, third improved signal, and so on until the N–2th improved signal. In step 255, the N–2th improved signal is combined with the second decomposed signal, the second modified signal, or both, as discussed previously in step 245, producing a N–1th improved signal. It will be appreciated that signals may be combined using different methods. For example, at the third level, the N–2th improved signal may be multiplied by the third modified signal, and the third decomposed image could be subtracted from the resulting image. Note that suitable combination methods are dependent on the signal format, the desired results, and other factors.

In step 260, the N–2th improved signal is recomposed into a N–1th recomposed signal, as described in step 250. The N–1th recomposed signal is combined with the first decomposed signal, the first modified signal, or both, as described in step 245, resulting in a Nth improved signal. In step 270, the Nth improved signal is recomposed into a Nth recomposed signal, similar to the method discussed in step 250.

In one embodiment, Nth recomposed signal is combined, as described previously, with the base signal in step 275, resulting in an improved base signal. In another embodiment, it is unnecessary to combine Nth recomposed signal with the base image, in this case, step 275 can be omitted, and the Nth recomposed signal is referred to as an improved base signal. In step 280, the improved based signal may be output to an output or display device, such as a printer or computer monitor, saved to a storage device, transmitted to another system for additional processing, and the like. Although a method has been illustrated with processing and combination steps (such as steps 230 and 255) between each pyramidal decomposition step (such as step 215), one or more processing and/or combination steps may be omitted from one or more pyramidal decomposition levels without departing from the spirit or the scope of the present invention.

In at least one embodiment, method 200 is implemented on a data processor or a digital film development system. In this case, method 200 could be implemented as a program of instructions, where the program of instructions process a data set representing a signal as described previously. The program of instructions could be stored in memory and retrieved from memory by a processor for execution of the program of instructions. In another embodiment, method 200 could be implemented in analog or digital hardware, where the analog or digital hardware is structure or adapted to perform the steps of method 200. One advantage of method 200 is that less processing time and/or effort is needed, in one embodiment, to increase the SNR of an original base signal. In many cases, the amount of effort required to process a signal is not linearly proportional to the resolution of the signal. For example, the processing effort for some blurring or other image modification methods may be proportional to the square of the resolution of the image being processed. In this case, if an image A has a resolution of 100×100 and an image B has a resolution of 200×200, resulting in a four-fold increase in resolution between image A and B (from 10,000 pixels in image A to 40,000 pixels in image B) resulting in sixteen times the effort required to process image B than required to process image A. Similarly, many methods of combining signals such as images are linearly, or nearly linearly, proportional to the change in resolution. Therefore, by repeatedly decomposing a signal into signals of lesser resolution, processing the decomposed signals at a certain level with considerably less effort than would be required at the base level, and then recomposing and combining the processed signals often results in an improved base image having improved quality equivalent or better than other methods, with less processing time and/or effort required for the given result.

Figure 3:
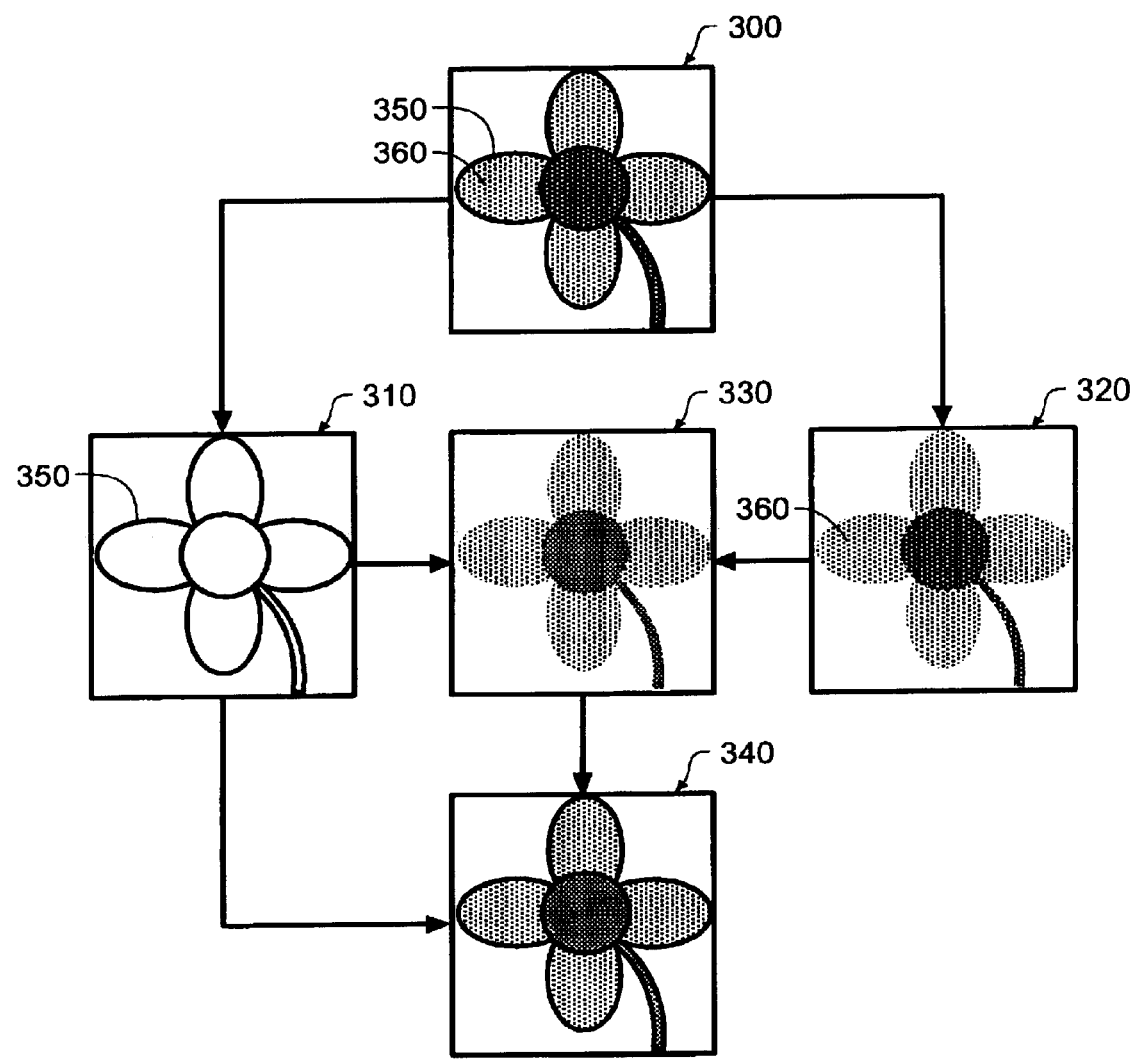
FIG. 3 is a pictorial diagram demonstrating a sheep and shepherd guiding method according to at least one embodiment of the present invention.

As mention previously, a sheep and shepherd method can be utilized to modify a decomposed signal on one or more pyramidal decomposition levels. In one embodiment, a sheep and shepherd method is commenced and finished on a single pyramid level, while in another embodiment, one or more sheep and shepherd methods is utilized over a plurality of levels in the pyramidal decomposition. Referring now to FIG. 3, an illustration demonstrating a method of using sheep and shepherd artifacts to improve an image (base signal) is discussed according to at least one embodiment of the present invention. Image 300 is a visual representation of a data set resulting from the capture of a base signal (the image). For example, image 300 may represent an image captured in photographic film, on X-ray film, one or more frames of a video film, an infrared image captured by a satellite, etc.

In at least one embodiment, image 300 includes one or more shepherd artifacts 310 and one or more sheep artifacts 320. Shepherd artifact 310 includes edge 350, and sheep artifact 320 includes color information 360. In most cases, shepherd artifact 310 will have less noise than sheep artifact 320 for a certain same characteristic (signal component). In embodiments where the signal to be processed is an image, shepherd artifacts 310 generally have the property of strong definition of boundary parameters or strong demarcation, such as lines and edges (edge 350), while sheep artifacts 320 generally have the property of a variation within the boundary parameter, such as color (color information 360), tones, and hues.

Although the term "artifact" is often used in other circumstances to refer to an undesirable phenomenon or unwanted result, the term "artifact," as used herein, refers to the representation of a property or one or more components of a signal. Properties and/or components represented by artifacts can include, but are not limited to, the magnitude or phase of a signal, a color information represented in a layer of film, the edges or detail in an image, a representation of a signal at a given point in time, and the like. Analogous to the shepherd guiding his flock, in at least one embodiment of the present invention, an artifact having a higher SNR for a given property is used to guide an artifact having a lower SNR for the given property. The term "shepherd artifact," as used herein, refers to an artifact exhibiting one or more particular properties and having more information, or information of a higher quality, for the one or more properties than other artifacts exhibiting the same one or more properties. Likewise, the term "sheep artifact," as used herein, refers to an artifact exhibiting one or more particular properties and exhibiting less information, or information of a lesser quality, for a certain one or more properties than other artifacts exhibiting the same one or more properties, and the guided property of the sheep artifact correlates to, but can be different from, the guide property of the shepherd artifact.

A method of using shepherd artifacts to guide sheep artifacts to improve a base signal can be illustrated by way of example. In this example, image 300, representing an embodiment of a base signal, contains noise, such as "white" noise introduced by the digitization of the image from photographic film. Since shepherd artifact 310 contains edge 350, which generally has less noise than color information 360 in sheep artifact 320, shepherd artifact 310 may guide sheep artifact 320 to reduce noise associated with color information 360. In another example, sheep artifact 320 could exhibit relatively good color information (color information 360) but lack detail, whereas shepherd artifact 310 exhibits greater detail. Shepherd artifact 310 could then guide sheep artifact 320 to increase detail in sheep artifact 320, resulting in guided artifact 330 with good color information and improved detail.

A number of methods may be used to guide sheep artifact 320 using shepherd artifact 310. For example, in one embodiment, blurring is used to eliminate noise. Blurring may be used to "average" out the characteristics or signal components, such as color, of one or more pixels in a selected region. However, blurring regions of sharp contrast, such as edges or areas of sharp contrast, often results in unacceptable degradation of the edges. Edge 350 of shepherd artifact 310 may be used, in one embodiment, to determine the location of edges of color information 360 in sheep artifact 320. Regions away from edge 350 may be blurred to a greater extent than those near or adjacent to edge 350. By using shepherd 310 to guide sheep 320 in the blurring process, noise can be removed from color information 360, resulting in guided artifact 330. In this example, some or all of the information contained in shepherd artifact 310 may be combined with guided artifact 330 to produce improved image 340 containing less noise than image 300 without a loss in the sharpness of the edges (edge 350) contained in the image 300. Various methods of guiding sheep artifacts using shepherd artifacts according to various embodiment are discussed in more detail with reference to FIG. 4.

Figure 4:
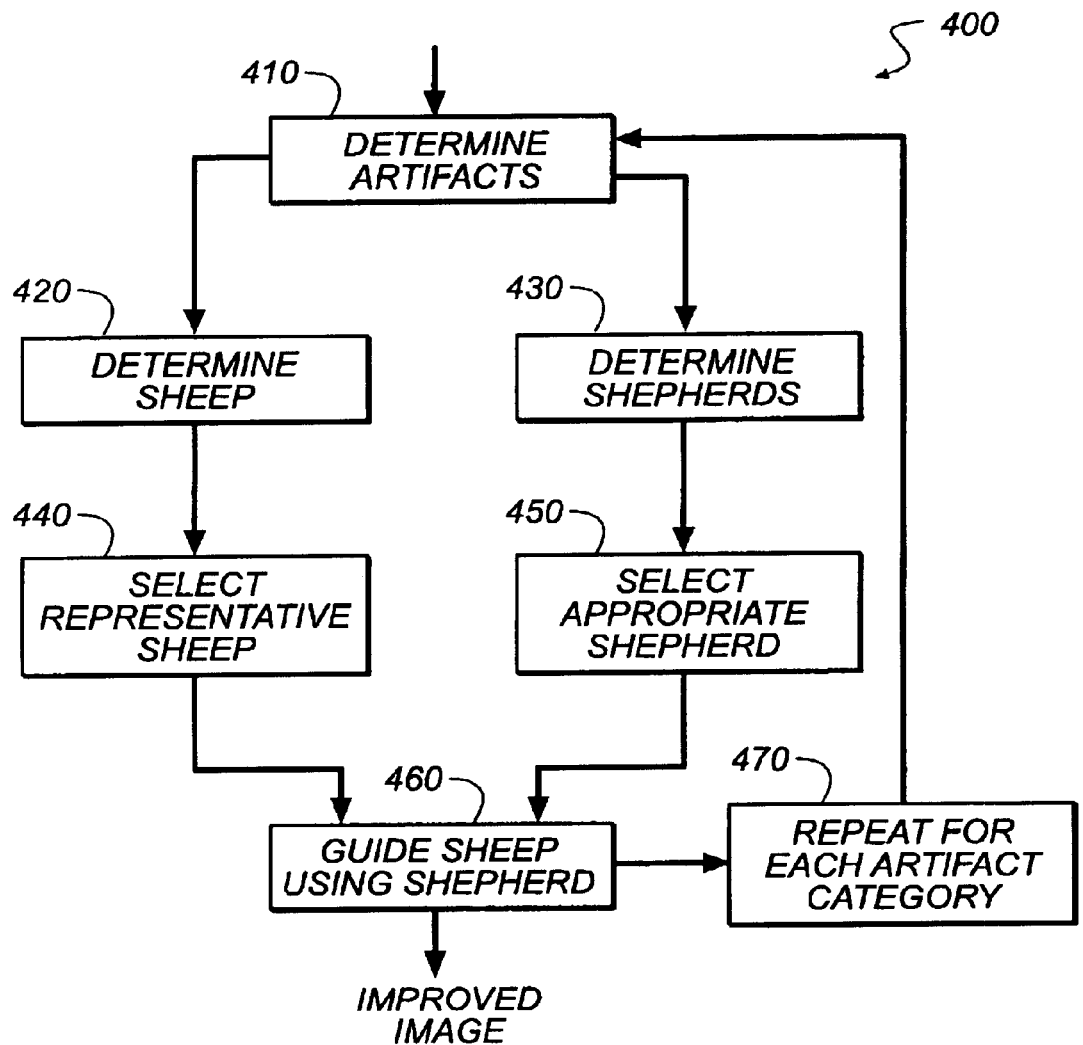
FIG. 4 is a flow diagram illustrating a method for using sheep and shepherd artifacts to improve signals according to at least one embodiment of the present invention.

Referring next to FIG. 4, a method for improving a base signal using sheep and shepherd artifacts is illustrated according to at least one embodiment of the present invention, and designated generally as sheep and shepherd method 400. Shepherd method 400 is one embodiment of steps 220, 230, and/or 240 referenced in FIG. 2. Sheep and shepherd method 400 initiates with step 405, wherein a signal captured in a recording medium is extracted and converted to a form that can be manipulated. One embodiment wherein an image (the base signal) captured on photographic film (the recording medium) is extracted by a film scanner or other device and converted to a digital data set (the form to be manipulated) representative of the signal components obtained from the photographic film will be used for illustration purposes. In other embodiments, other signals (captured on other mediums), such as microwave transmission signals, cellular phone transmissions, x-ray scans, infrared images and radar images, maybe improved by generally following the steps of sheep and shepherd method 400.

In one embodiment, a single base signal is used to guide sheep artifacts using shepherd artifacts within the base signal. Although one base signal can contain adequate information to use shepherd artifacts to guide sheep artifacts within the base signal, different signals of a same subject often contain different or additional information about the subject that can prove useful in guiding artifacts. For example, a photograph of a subject (the base signal), such as a flower, taken during the day will often have substantial color information (a first desired signal component), but may be lacking in detail as the lines, edges, and areas of demarcation (a second desired component) are de-emphasized (fuzzy) due to the emphasis on the color. However, a photograph of the same flower taken at night may have substantial detail in the edges and lines (the second desired signal component), but have very little color information (the first desired signal component). The one or more signal components in one of the original base signals may be used as a shepherd artifact to guide the sheep artifact in the other base signal, thereby creating an improved base signal with greater detail without loss of the color information, i.e. a higher signal-to-noise ratio as the amount of detail information increased relative to the total amount of single component information. Accordingly, at least one embodiment of the present invention includes the utilization of a plurality of base signals in sheep and shepherd method 400.

In step 410, artifacts are identified in the one or more base signals. In at least one embodiment, artifacts are determined by varying a parameter in relation to the initial signal capturing processes, such as light intensity, the frequency of the radiation emitted from a radiation source, and the like in cases where the base signals are photographic images. For example, the previous day and night image example, the time of day (i.e. changes in light intensity) could be the varied parameter used to capture different images of the same subject. In this case, the image of the subject taken during the day could produce one or more artifacts, while the image taken at night could produce one or more different artifacts. In another embodiment, artifacts are determined by varying a parameter during the conversion of the recorded base signal to a digital data set representative of the base signal. For example, during film development, a plurality of images could be captured of the film in various phases of development, with each of the plurality of images containing different artifacts having different information with regard to color and detail. In another example, the different layers of photographic film sensitive to different frequencies of light, such as the red, green, and blue layers, could be used to determine different artifacts for each of the color layers. Note that other methods of determining artifacts from signals may be used without departing from the spirit or the scope of the present invention.

In at least one embodiment, artifacts determined in step 410 are associated into one or more categories defined by a property, such as detail, intensity, hue, etc. For example, in a case where multiple images of a subject are used to determine artifacts, artifacts determined to have substantial detail information may be categorized together, while artifacts determined to have substantial color hue information may be grouped together in an associated category. It will be appreciated that other appropriate properties may be used to categorize artifacts.

In step 420, sheep artifacts (sheep artifact 320, FIG. 3) are identified from the artifacts determined in step 410. In at least one embodiment, the sheep artifacts are determined by comparing the "signal-to-noise ratio (SNR)" of a certain signal component for a selected artifact with the signal-to-noise ratios of the remaining artifacts, where the sheep artifacts are identified as having a relatively low SNR for the certain property. Similarly, in step 430, shepherd artifacts (shepherd artifact 310, FIG. 3) are determined from the artifacts in step 410. As with the sheep artifacts, in at least one embodiment, shepherd artifacts are determined by comparing the SNR (or quality) of a certain signal component for a selected artifact with the SNRs of the remaining artifacts, where shepherd artifacts generally have a high SNR for the certain signal component.

After the sheep artifacts for a particular property are identified in step 420, in one embodiment, a representative sheep artifact is determined in step 440. The representative sheep artifact may be determined using a variety of methods, such as calculating an average or weighted average of all associated sheep artifacts to derive a representative sheep artifact. Another example is to use the sheep artifact with the highest or lowest SNR for the selected property. Likewise, a representative shepherd artifact is determined from the one or more shepherd artifacts.

The representative shepherd artifact, in one embodiment, is selected based on a desired image improvement outcome. For example, if a captured image originally exhibits proper color information, such as intensity and hue, but lacks adequate sharpness or detail, increasing detail could be a desired image improvement outcome. In this example, the selection of the representative shepherd artifact could be based on selecting the shepherd artifact exhibiting the greatest amount of image detail, such as distinct edges. In other situations where other image improvement outcomes are desired, such as noise reduction, a shepherd artifact exhibiting a desired property to the greatest extent can be chosen. Representative sheep and/or shepherd artifacts, in one embodiment, are selected using a mathematical algorithm to process data sets representative of one or more images on a digital film development system or other processing system. In other embodiments, representative sheep and/or shepherd artifacts maybe chosen by subjective determination by a user, using electronic measurement equipment, etc. It will be appreciated that one or more representative sheep and/or shepherds may be chosen for a given property or desired outcome.

After determining the appropriate representative sheep and shepherd artifacts, the representative shepherd artifact, in one embodiment, is used as a guide for altering the representative sheep artifact in step 460 to produce an improved artifact. A variety of methods according to various embodiments may be used to for guiding sheep artifacts using shepherd artifacts. In one embodiment, a Fourier transform, such as a fast Fourier transform (FFT) is performed on both the representative sheep and shepherd artifacts, resulting in a magnitude and phase for the various elements of the artifacts. The phase of the representative sheep artifact is replaced by the phase of the representative shepherd artifact, while the magnitude of the representative sheep artifact is limited by the representative shepherd artifact. The resulting artifact exhibits an improved property or signal component over the original representative sheep artifact. For example, recall that shepherd artifacts in images generally relate to artifacts associated with sharpness or edges, while sheep artifacts in images are generally associated with color intensities, hue, etc. So by replacing the phase of the sheep artifact with the phase of the shepherd artifact, and limiting the magnitude of the sheep artifact by the magnitude of the shepherd artifact, the resulting artifact retains the color information while exhibiting increased image detail.

In another example, a representative shepherd artifact may be used to guide a representative sheep artifact during a filter operation, such as blurring of an image to reduce noise. For example, if the sheep artifact of an image includes color information having noise, a common method of noise reduction is to the blur the image portion where noise exists. However, blurring often causes a reduction in detail around edges and other lines or areas of contrast or demarcation. In one embodiment, the representative shepherd artifact guides the filtering process of the representative sheep artifact. Using the previous example, the representative shepherd artifact could be used to determine areas of detail in the representative sheep artifact, and the blurring process on the representative image could be reduced or avoided in the determined detailed areas. It will be appreciated that other methods of guiding a sheep artifact using a shepherd artifact may be used without departing from the spirit or the scope of the present invention.

After guiding the representative sheep artifact using the representative shepherd artifact for a certain signal component or property, another signal component or property may be selected from a group of desired properties in step 470, after which steps 410 through steps 460 are repeated for each desired signal component or property. For example, a resultant image with improved detail, color intensity, and hue could be desired. In a first cycle, a representative shepherd exhibiting high quality detail and a representative sheep artifact exhibiting high quality color intensity could be determined in steps 420 through steps 450. Then in step 460, the shepherd artifact guides the sheep artifact, resulting in a first guided artifact 330 (FIG. 3) having improved detail and color intensity. In step 470, the second property or category of hue is chosen, and steps 420–250 are repeated using hue as the desired sheep artifact property, while the representative shepherd artifact remains the same as in the previous cycle. In a second step 460, the shepherd artifact guides the sheep artifact having high quality hue information, resulting in a second guided artifact 330 having improved detail and hue. The first and second artifacts 330 may then be combined to produce an image having improved detail, color intensity, and hue (improved image 340, FIG. 3) over the original image.

Figure 5:
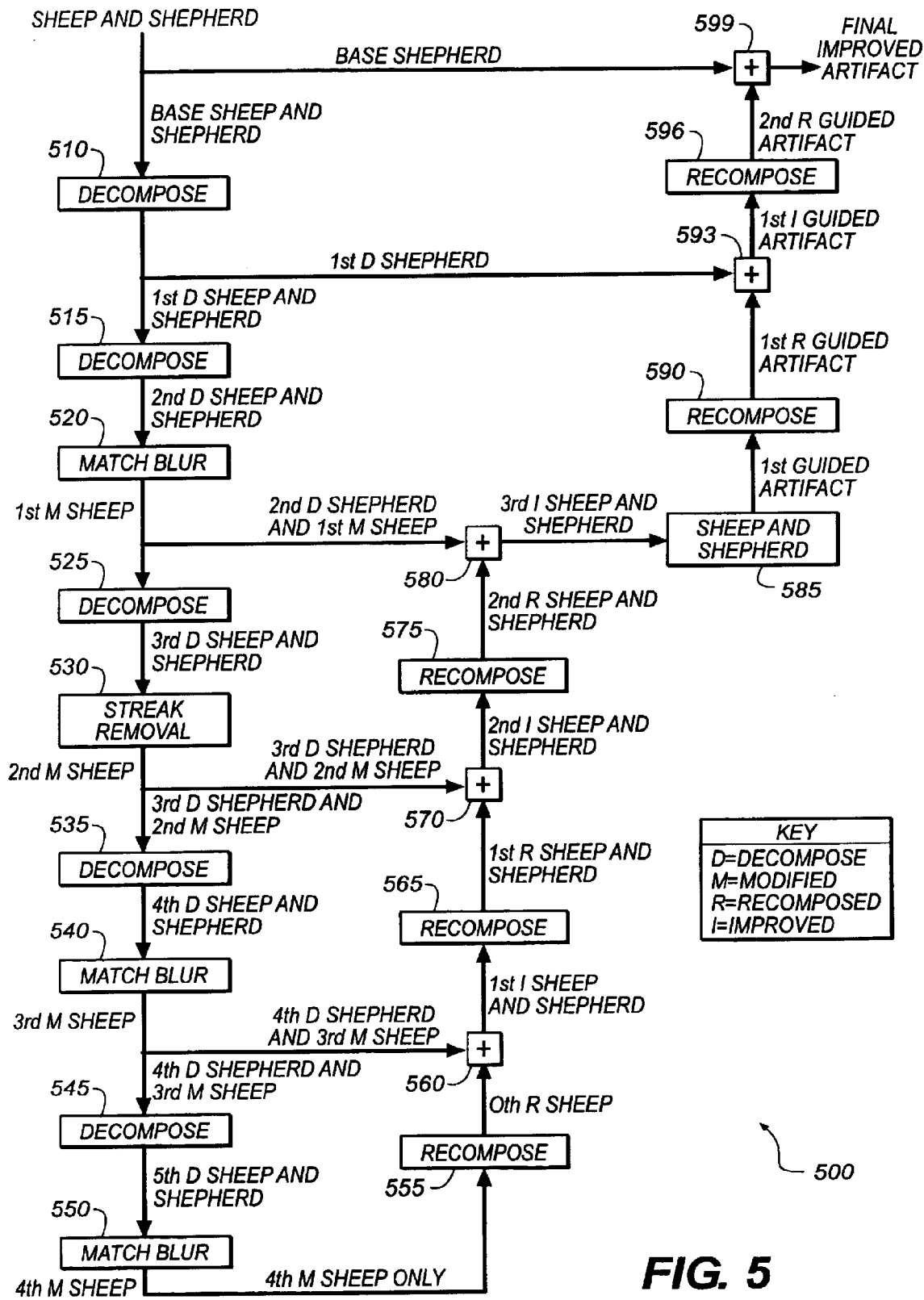
FIG. 5 is a flow diagram illustrating a method for improving the quality of an image using pyramidal decomposition according to at least one embodiment of the present invention.

Referring next to FIG. 5, a pyramidal decomposition method using sheep and shepherd artifacts is illustrated according to one embodiment of the present invention, and generally designated as method 500. The following method may be applied to a plurality of types of signals, but for ease of illustration, the method as it applies to image processing is discussed. The method commences with a representative sheep and shepherd artifacts of a base image, herein referred to as the base shepherd and base sheep, determined as discussed previously with reference to FIG. 4. A copy of the base shepherd is reserved for use in a later step. In step 510, the base sheep and shepherd are decomposed to a lower resolution, resulting in a first decomposed sheep and shepherd. As discussed previously, the step of decomposing can include downsampling, decimation, etc by a factor n. A copy of the first decomposed shepherd is reserved for a later step. The first decomposed sheep and shepherd are then decomposed again in step 515, as in step 510, resulting in a second decomposed sheep and shepherd.

In step 520, the second decomposed sheep is modified, resulting in a first modified sheep. A copy of the first modified sheep is reserved for a later step. In one embodiment, the modification process includes a match blur method. The match blur method, in many cases, is used to reduce or eliminate noise and/or magenta mottle.

Next, the first modified sheep and the second decomposed shepherd are decomposed again in step 525, as in step 515, resulting in a third decomposed sheep and decomposed shepherd. A copy of the third decomposed shepherd is reserved for use in a later step. The third decomposed sheep is then modified in step 530, resulting in a second modified sheep. In one embodiment, a streak removal process, such as removal of magenta streaks, is performed on the second decomposed sheep. A copy of the second modified sheep is reserved for use in a later step.

In step 535, the second modified sheep and third decomposed shepherd are decomposed a fourth time resulting in a fourth decomposed sheep and shepherd. A copy of the fourth decomposed shepherd is reserved for use in a later step. In step 540, the fourth decomposed sheep is modified, resulting in a third modified sheep. In one embodiment, the modification step includes applying a match blur to the third decompose sheep, as in step 520. A copy of the third modified sheep is reserved for use in a later step. The decomposition and modification process are repeated again in steps 545 and 550, as in steps 535 and 540. A fifth decomposed sheep and shepherd, as well as a fourth modified sheep are produced.

In step 555, the fourth modified sheep is recomposed in a manner discussed previously with reference to FIG. 2, resulting in a zeroth recomposed sheep. The third modified sheep is combined in step 560 with the first improved sheep and the fourth decomposed shepherd reserved in steps 540, 535 is combined with the first improved shepherd, resulting in a first improved sheep and shepherd. The combination methods, as discussed previously, can include image stitching, multiplication, overlay, etc. In step 565, the first improved sheep and shepherd are recomposed, as in step 555, resulting in a first recomposed sheep and shepherd. In step 570, the first recomposed sheep is combined with the second modified sheep and the first recomposed shepherd is combined with the second decomposed shepherd artifact, as in step 560, resulting in a second improved sheep and shepherd. In step 575, the second improved sheep and shepherd is recomposed, as in step 565, resulting in a second recomposed sheep and shepherd. The second recomposed sheep is then combined with the second decomposed shepherd and the first modified sheep is in step 580, resulting in a third improved sheep and shepherd.

In step 585, a guiding step is performed, as discussed with reference to FIGS. 3 and 4, using the third improved sheep as a representative sheep and the third improved shepherd as the representative shepherd. The resulting first guided artifact, in at least one embodiment, has an increased SNR for at least one or more image components or properties.

In step 590, the first guided artifact is recomposed, as in step 575, resulting in a first recomposed guided artifact. The first recomposed guided artifact is combined with the first decomposed shepherd in step 593, as in step 560, resulting in a first improved guided artifact. The first improved guided artifact is recomposed in step 596, resulting in a second recomposed guided artifact. The second recomposed guided artifact is combined in step 599 with the base shepherd, resulting in a improved base artifact having the original resolution of the base artifacts. For example, steps 510–599 are performed with an shepherd artifact having relatively more detail than a sheep artifact (base sheep and shepherd artifacts), which in turn has relatively more color information than the shepherd artifact. As a result, the first guided artifact has increased detail while retaining the original color information. Since the detail is increased while the extraneous and/or undesired information (noise and streaks) is decreased in steps 520, 530, and 540. Therefore, the signal-to-noise ratio, as defined previously, has increased.

In one embodiment, steps 510–599 can be repeated for each sheep and shepherd artifact determined in one or more images (signals). The resultant improved base artifacts can then be combined to create an improved base image having improved quality over the original. Recall that method 500 may be utilized for a variety of signals in addition to images, such as using method 500 to pyramidally decompose an audio signal to reduce noise within a certain frequency band, such as the audible band.

As previously discussed, in at least one embodiment, a signal being processed by one or more methods of the present invention is an image recorded using photographic film. Since the image is represented by the film and cannot be easily manipulated or processed in its current form, in one embodiment, the image recorded in the photographic film is digitized for further processing. Conventional film digitization processes scan the film negative using a conventional electronic scanner to produce a digital image that electronically represents the photographic image. Conventional electronic film scanners generally operate by directing white light through the film negative. The light interacts with the dye image and the intensity of light transmitted through the film is recorded by a sensor that produces individual red, green and blue color data. The sensor color data is used to produce the digital image.

A relatively new process under development is digital film processing (DFP). DFP systems scan the film during the development process. DFP systems apply a thin coat of one or more film processing solutions to the film and then scan the film through the coating. Nthe processing solutions nor the silver compounds within the film are washed from the film. DFP systems may comprise a number of different configurations depending upon the method of film processing and the method of scanning the film. For example, in some embodiments, the metallic silver grains and silver halide are not modified and the film is scanned with visible light. Accordingly, in at least one embodiment, a digital film development system is used to digitize and process one or more images recorded in photographic film. One embodiment of a digital film development system is discussed with reference to FIGS. 6–16.

Figure 6:
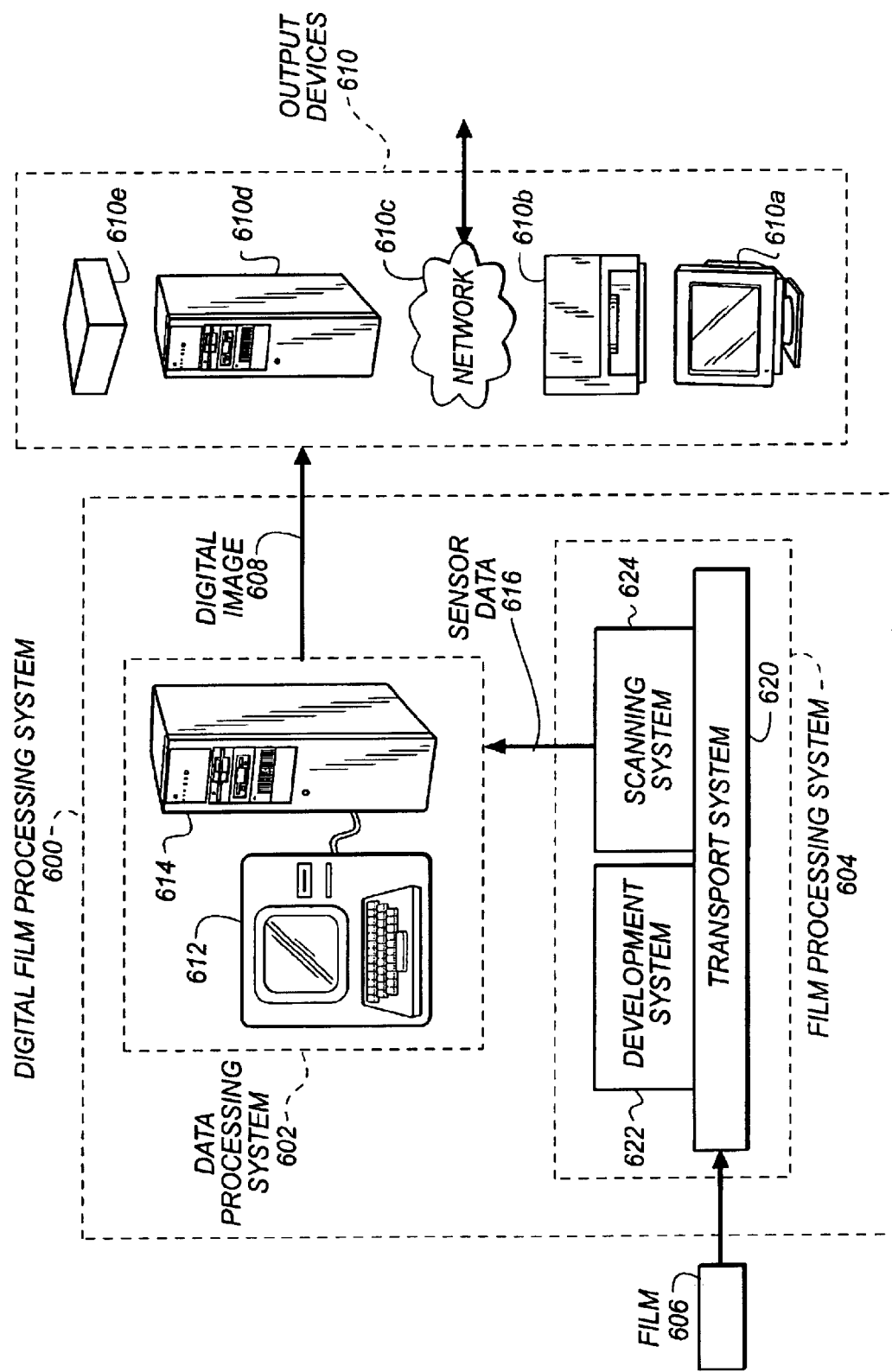
FIG. 6 is a block diagram of an improved digital film development system according to at least one embodiment of the present invention.

FIG. 6 is an example of one embodiment of a digital film development system 600. In this embodiment, the system 600 comprises a data processing system 602 and a film processing system 604 that operates to digitize a film 606 to produce a digital image 608 that can be output to an output device 610. Film 606, as used herein, includes color, black and white, x-ray, infrared or any other type of film and is not meant to refer to any specific type of film or a specific manufacturer.

Data processing system 602 comprises any type of computer or processor operable to process data. For example, data processing system 602 may comprise a personal computer manufactured by Apple Computing, Inc. of Cupertino, Calif. or International Business Machines of New York. Data processing system 602 may also comprise any number of computers or individual processors, such as application specific integrated circuits (ASICs). Data processing system 602 may include a user interface 612 operable to allow a user to input information into the system 600. The user interface 612 generally includes a display and a printer, but may also include such input devices as a keypad, point-of-sale device, voice recognition system, memory reading device such as a flash card reader, or any other suitable data input device.

Data processing system 602 includes image processing software 614 resident on the data processing system 602. Data processing system 602 receives sensor data 616 from film processing system 604. As described in greater detail below, sensor data 616 is representative of the image data and silver in the film 606 at each discrete location, or pixel, of the film 606. The sensor data 616 is processed by image processing software 614 to produce the digital image 608. The specific embodiment of the image processing software 614 is dependent upon the embodiment of the film processing system 604, and in particular, the specific embodiment of the scanning system, as described below. In an embodiment in which metallic silver grains and/or silver halide remains within the film 606, the image processing software 614 operates to compensate for the silver in the film 606. For example, one embodiment of image processing software 614 comprises software based on U.S. patent application Ser. No. 08/999,421, entitled Defect Channel Nulling, which is incorporated herein by reference. In this embodiment, any silver remaining in the film 606 is treated as a defect and each individual pixel color record is compensated to remove the effect of the silver. In an embodiment in which the metallic silver grains and silver halide have been modified to a substantially transparent silver compound, the film 606 may be scanned using only visible light without digitally compensating for any occlusions. Processing the film 606 without washing the silver from film 606 substantially reduces or eliminates the production of hazardous chemical effluents that are generally produced during conventional film processing methods. Although the image processing software 614 is described in terms of actual software, the image processing software 614 may be embodied as hardware, such as an ASIC. The color records for each pixel form the digital image 608, which is then communicated to one or more output devices 610.

Output device 610 may comprise any type or combination of suitable devices for displaying, storing, printing, transmitting or otherwise outputting the digital image 608. For example, as illustrated, output device 610 may comprise a monitor 610a, a printer 610b, a network system 610c, a mass storage device 610d, a computer system 610e, or any other suitable output device. Network system 618cmaybe any network system, such as the Internet, a local area network, and the like. Mass storage device 610d may be a magnetic or optical storage device, such as a floppy drive, hard drive, removable hard drive, optical drive, CD-ROM drive, and the like. Computer system 610e may be used to further process or improve the digital image 608.

As described in greater detail below, film processing system 604 operates electronically scan the film 606 to produce the sensor data 616. Light used to scan the film 606 may include light within the visible portion of the electromagnetic spectrum, light within the infared portion of the electromagnetic spectrum, a combination of visible and infrared light, or any other suitable electromagnetic radiation. As illustrated, film processing system 604 comprises a transport system 620, a development system 622, and a scanning system 624. Although the system 600 is illustrated with a development system 622, alternative embodiments of the system 600 do not require the development system 622. For example, film 606 may have been preprocessed and not require the development process described below.

Transport system 620 operates to dispense and move the film 606 through the film processing system 604. In one embodiment, the transport system 620 comprises a leader transport system in which a leader is spliced to the film 606 and a series of rollers advances the film 606 through the film processing system 604, with care taken that the image surface of the film 606 is not contacted. Similar transport systems 620 are found in film products manufactured by, for example, Noritsu Koki Co. of Wakayama, Japan, and are available to those in the art.

Figure 7:
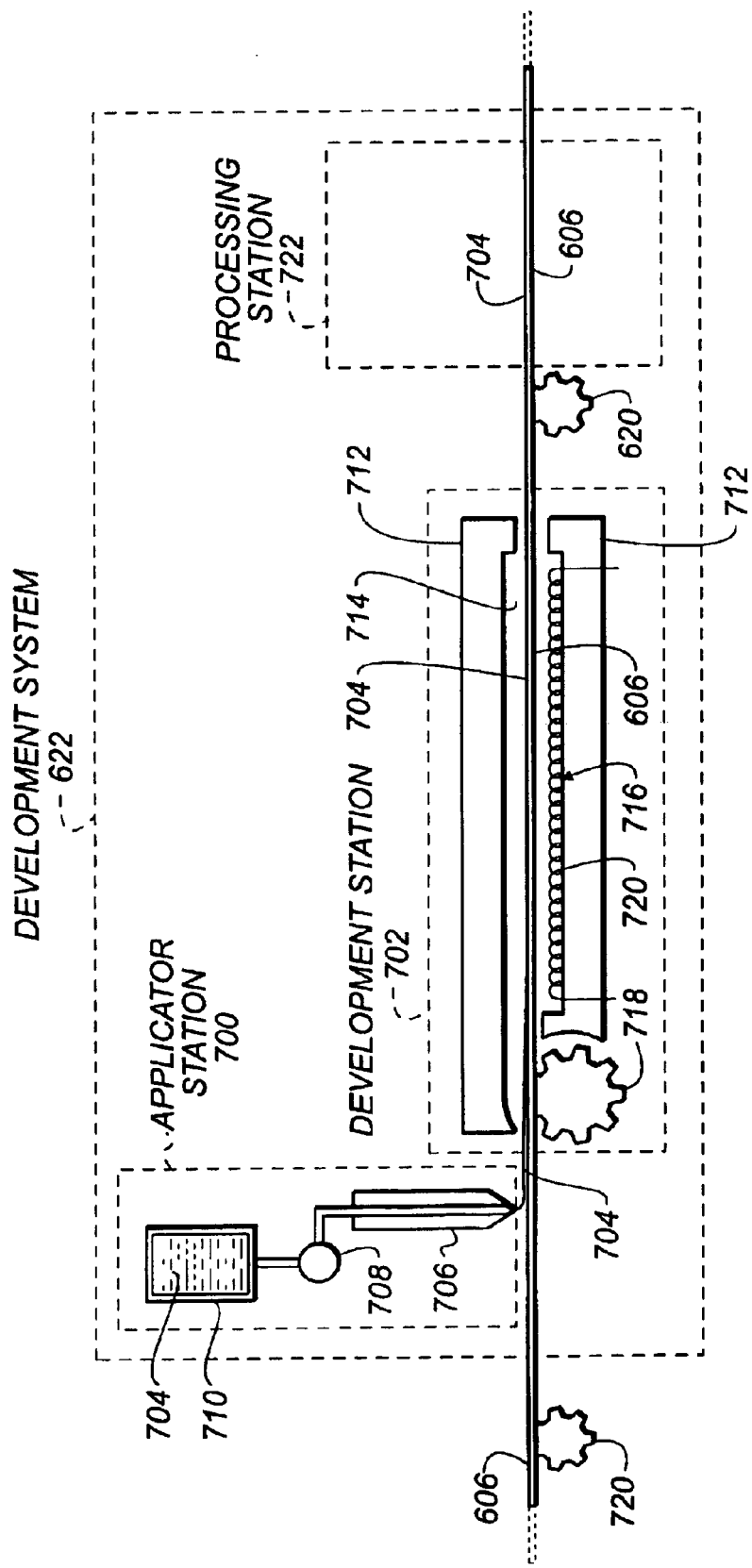
FIG. 7 is a block diagram illustrating a development system, as shown in FIG. 8, according to at least one embodiment of the present invention.

The development system 622 operates to apply one or more processing solutions to the film and develop the film 606, as described in greater detail in FIG. 7. In the preferred embodiment, the processing solution comprises a viscous color developer solution that initiates production of the metallic silver grains and the magenta, cyan and yellow dye images within the film 606. In an alternative embodiment, the processing solution comprises a black and white developer solution that initiates production of the metallic silver grains within the film 606. The processing solution may include other suitable processing agents. The development system 622 may also apply other suitable processing solutions, such as a stop solution, inhibitors, accelerators, bleach solution, fixer solution, blix solution (combines the functionality of a bleach solution and a fixer solution), stabilizer solution and the like.

The scanning system 624 scans the film 606 through the processing solutions applied to the film 606, as described in greater detail in FIGS. 14–18. In other words, the processing solutions are not substantially removed from the film 606 prior to the scanning process. In contrast, conventional film processing systems wash the contaminated processing solutions and hazardous silver compounds from the film and then dry the film to create a conventional film negative prior to any digitization process. The scanning station 624 may comprise a number of different configurations depending, in part, on how the film 606 was developed. In general, specific colors of visible light interact with the dye images and any silver present in the film 606, and infrared light interacts with the silver in the film 606. In some embodiments of the development system 622, the silver (metallic silver and/or silver halide) is modified to reduce the optical effects of the silver. For example, a bleaching agent may be applied to the film 606. The bleaching agent operates to oxidize the metallic silver grains within the film 606 to produce silver halide. The silver halide has a lower optical density than the metallic silver grains. As a result, a greater amount of light is transmitted through the film 606. Another example is a fixer agent. A fixer agent dissolves the silver halide to produce a silver compound that is substantially transparent to light. As a result, light is readily transmitted through the film 606.

The scanning station 624 scans the film 606 using electromagnetic radiation and produces sensor data 616 representative of the film image data, as described in greater detail in FIGS. 14–18. In the preferred embodiment of the scanning station 624, the film 606 is scanned with light within the visible and infrared portions of the electromagnetic spectrum. The visible light measures the light intensity associated with the dye clouds as well as the silver within the film 606, and the infrared light measures the light intensity associated with the metallic silver grains within the film 606. In particular, one or more bands of visible light may be used to scan the film 606. For example, the film 606 may be scanned using visible light within the red, green and/or blue portions of the electromagnetic radiation spectrum. In other embodiments of the scanning station 624, the film 604 is scanned with only visible light, with only infrared light, with different combinations of visible light, or any other suitable electromagnetic radiation. The processing solutions are not substantially removed prior to scanning the film 606. In contrast, conventional film processing systems wash all the processing solutions and silver, both silver halide and metallic silver, from the film 606 prior to any conventional scanning processes. Silver, whether metallic silver or silver halide crystals, in the film negative interferes with the transmission of light through the film negative and would be digitized along with the image. Any silver in the film negative appears as defects in the resulting digital image.

In operation, exposed, but undeveloped film 606 is fed into the transport system 620. The film 606 is transported through the development system 622. The development system 622 applies a processing solution to the film 606 that develops the film 606. The transport system 620 moves the film 606 through the scanning system 624. The scanning system 624 illuminates the film 606 with light. Light from the film 606 is measured by the sensor system, which produces sensor data 616. The sensor data 616 represents film image data in the film 606 at each pixel. The sensor data 616 is communicated to data processing system 602. The data processing system 602 processes the sensor data 616 using image processing software 614 to produce the digital image 608. The data processing system 602 may also operate to improve or otherwise modify the digital image 608. For example, the digital image 608 maybe modified in accordance with input from the user. The data processing system 602 communicates the digital image 608 to the output device 610 for viewing, storage, printing, communicating, or any combination of the above.

In a particular embodiment of the digital film development system 600 the system 600 is adapted to a self service film processing system, such as a kiosk. Such a self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location. In other embodiments, the system 600 may be used for commercial film lab processing applications. Again, because there is no plumbing and the environmental impact of processing the film 606 is substantially reduced or eliminated, the installation cost and the legal liability for operating such a film lab is reduced. The system 600 can be adapted to any suitable application without departing from the scope and spirit of the invention.

FIG. 7 illustrates one embodiment of the development system 622. In this preferred embodiment, a development system 622a comprises an applicator station 700 and a development station 702. The applicator station 700 operates to apply a relatively uniform coating of a processing solution 704 to the film 606. In one embodiment, the processing solution 704 comprises a color developer solution, such as Flexicolor Developer for Process C-41 available from the Eastman Kodak Company. In other embodiments, the processing solution 704 comprises other suitable solutions. For example, the processing solution 704 may comprise a monobath solution that acts as a developer and stop solution.

In a particular embodiment, the applicator station 700 comprises an applicator 706, a fluid delivery system 708, and a reservoir 710. The applicator 706 operates to coat the film 606 with the processing solution 704. In the preferred embodiment, as illustrated, the applicator 706 comprises a slot coater device. In alternative embodiments, the applicator 706 comprises an ink jet applicator, a tank, an aerosol applicator, drip applicator, sponge applicator, or any other suitable device for applying the processing solution 704 to the film 606. The fluid delivery system 708 delivers the processing solution 704 from the reservoir 710 to the applicator 706. In an embodiment in which the applicator 706 comprises a slot coater device, the fluid delivery system 708 generally delivers the processing solution 704 at a constant volumetric flow rate to help insure uniformity of coating of processing solution 704 on the film 606. The reservoir 710 contains a sufficient volume of processing solution 704 to process multiple rolls of film 606. In the preferred embodiment, the reservoir 710 comprises a replaceable cartridge. In other embodiments, the reservoir 710 comprises a refillable tank. The applicator station 700 may comprise other suitable systems and devices for applying the processing solution 704 to the film 606.

The development station 702 operates to give the film 606 time to develop prior to being scanned by the scanning system 624. In the embodiment illustrated, the development station 702 forms that portion of the transport system 620 between the applicator 706 and the scanning system 624. The length of the development station 702 is generally dependent upon the development time of the film 606. In particular, depending upon the environment and chemical nature of the processing solution 704, development of the film 606 may require as little as a few seconds to as long as several minutes.

As illustrated, the development station 702 comprises a cover 712 that protects the film 606 during development. The cover 712 forms an environmental chamber 714 surrounding the film 606. The temperature and humidity within the environmental chamber 714 are strictly controlled. To facilitate controlling the temperature and humidity, the environmental chamber 714 has a minimum volume surrounding the film 606. The cover 712 may be insulated to maintain a substantially constant temperature as the film 606 is developed. In order to maintain the temperature, the development station 702 preferably includes a heating system 716. As illustrated, the heating system 716 may include a heated roller 718 and heating element 720. In addition, the heating system 716 may include a processing solution heating system (not expressly shown) that heats the processing solution 704 prior to its application to the film 606.

In an alternative embodiment, the development system 622 includes a processing station 722. The processing station 722 operates to further process the film 606 prior to being scanned by the scanning system 624. For example, in on embodiment, the processing station 722 operates to modify the metallic silver grains and or silver halide in the film 606. Modifying the silver within the film 606 decreases the opacity of the film 606, thereby improving the transmissivity of light through the film 606. In another embodiment, the processing station 722 operates to retard or substantially reduce the continued development of the film 606. Retarding or substantially stopping the continued development of the film 60606 increases the amount of time the film 606 can be exposed to visible light without substantially fogging of the film 606. In another embodiment, the processing station 722 operates to modify the silver and also substantially reduce the continued development of the film 606. FIGS. 8–11 illustrate different examples of the processing station 722.

In operation, transport system 620 transports the film 606 through the applicator station 700. Fluid delivery system 708 dispenses the processing solution 704 from the reservoir 710 through the applicator 706 onto the film 606. The processing solution 704 initiates development of the dye image and silver image within the film 606. The coated film 606 is then transported through the development station 702. As discussed above, the development station 702 allows the film 606 time to develop within a controlled environment. In an alternative embodiment, the film 606 is then transported through the processing station 722 where the film 606 is further processed. The film 606 is then transported by the transport system 620 to the scanning system 624. As described above, the processing solution 704 coated on the film 606 is not removed, but remains on the film 606 as the film 606 is transported to the scanning system 624.

FIG. 8 illustrates a processing station 722a that operates to apply one or more processing solutions 824 to the film 606. As illustrated, the processing station 722a comprises an applicator 706b, a fluid delivery system 708b, and a reservoir 710b, similar in function and design as applicator station 700 described in FIG. 7. Although a single applicator 706b, fluid delivery system 708b, and reservoir 710b is illustrated, the processing station 722a may comprise any number of applicators 706b, fluid delivery systems 708b, and reservoirs 710b that apply other suitable processing solutions 824 and other suitable solutions.

The processing solution 824 may comprise any suitable chemical applied to the film 606 to further process the film 606. In one embodiment, the processing solution 824 includes a fixer solution. As discussed previously, the fixer solution dissolves the silver halide into a substantially transparent silver compound. This has the effect of slightly reducing the opacity of the film 606, but substantially eliminating the sensitivity of the film 606 to any type of light. In another embodiment, the processing solution 824 includes a bleaching agent. The bleaching agent converts the metallic silver within the film 606 into silver halide. As a result, the opacity of the film 606 is greatly reduced, but the sensitivity of the film 606 to light is not substantially reduced. In yet another embodiment, both a bleaching agent and a fixing agent are applied to the film 606, or a single blix solution (combines functions of a bleaching agent and fixing agent). This has the effect of substantially reducing the opacity of the film 606 and also substantially reducing the sensitivity of the film 606 to light. The processing solution 824 may also include an aqueous solution, stopping agents, stabilizing agents, or any other suitable film processing agent or solutions without departing from the scope of the invention.

FIG. 9 illustrates a processing station 722b that operates to chill the developing film 606. Chilling the developing film 606 substantially slows the chemical developing action of the processing solution 704. In the embodiment illustrated, the processing station 722b comprises an electrical cooling roller 926 and insulation shield 928. In this embodiment, the cooling roller 926 is electronically maintained at a cool temperature that substantially arrests the chemical reaction of the processing solution 704. The insulation shield 928 substantially reduces the heat transfer to the cooling roller 926. The processing station 722b may comprise any other suitable system and device for chilling the developing film 606.

FIG. 10 illustrates a processing station 722c that operates to dry the processing solution 704 on the coated film 606. Drying the processing solution 704 substantially stops further development of the film 606 and may also decrease the opacity of the film 606. In the embodiment illustrated, the processing station 722c comprises an optional cooling roller 926, as described in FIG. 9, and a drying system 1030. Although heating the coated film 606 would facilitate drying the processing solution 704, the higher temperature would also have the effect of accelerating the chemical reaction of the processing solution 704 and film 606. Accordingly, in the preferred embodiment, the film 606 is cooled to retard the chemical action of the processing solution 704 and then dried to effectively freeze-dry the coated film 606. Although chilling the film 606 is preferred, heating the film 606 to dry the film 606 can also be accomplished by incorporating the accelerated action of the developer solution 704 into the development time for the film 606. In another embodiment in which a suitable processing solution 824 is applied to the film 606, the chemical action of the processing solution 704 is already minimized and the film 606 can be dried using heat without substantially effecting the development of the film 606. As illustrated, the drying system 1030 circulates air over the film 606 to dry the processing solution 704 and depending upon the embodiment, the processing solution 824. The processing station 722c may comprise any other suitable system for drying the film 606.

FIG. 11 illustrates a processing station 722d that operates to substantially remove excess processing solution 704, and any excess processing solution 824, from the film 606. The processing station 722d does not remove the solutions 704, 824 that are absorbed into the film 606. In other words, even after the wiping action, the film 606 includes some processing solutions 704, 824. Removing any excess processing solution 704 will retard the continued development of the film 606. In addition, wiping any excess processing solutions 704, 824 from the film 606 may improve the light reflectance and transmissivity properties of the coated film 606. In particular, removal of the excess processing solutions 704, 824 may reduce any surface irregularities in the coating surface, which can degrade the scanning operation. In the embodiment illustrated, the processing station 722d comprises a wiper 1132 operable to substantially remove excess processing solution 704 and any processing solution 824. In a particular embodiment, the wiper 1132 includes an absorbent material that wicks away the excess processing solutions 704, 824. In another embodiment, the wiper 1132 comprises a squeegee that mechanically removes substantially all the excess processing solutions 704, 824. The processing station 722d may comprise any suitable device or system operable to substantially remove any excess processing solutions 704, 824.

Although specific embodiments of the processing station 722 have been described above, the processing station 722 may comprise any suitable device or system for further processing the film 606. In particular, the processing station 722 may comprise any suitable combination of the above embodiments. For example, the processing station 722 may comprise an applicator station 700b for applying a processing solution 824, a cooling roller 926, and a drying system 1030. As another example, the processing station 722 may comprise a wiper 1132 and a drying system 1030.

FIG. 12 is a diagram of the scanning system 624. Scanning system 624 comprises one or more scanning stations 1200. Individual scanning stations 1200 may have the same or different architectures and embodiments. Each scanning station 1200 comprises a lighting system 1202 and a sensor system 1204. The lighting system 1202 includes one or more light sources 1206 and optional optics 1208. The sensor system 1204 includes one or more detectors 1210 and optional optics 1212. In operation, the lighting system 1202 operates to produce suitable light 1220 that is directed onto the film 606. The sensor system 1204 operates to measure the light 1220 from the film 606 and produce sensor data 616 that is communicated to the to the data processing system 602.

Each scanning station 1200 utilizes electromagnetic radiation, i.e., light, to scan the film 606. Individual scanning stations 1200 may have different architectures and scan the film 606 using different colors, or frequency bands (wavelengths), and color combinations. In particular, different colors of light interact differently with the film 606. Visible light interacts with the dye image and silver within the film 606. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 1200 may utilize other suitable colors and wavelengths (frequency) ranges without departing from the spirit and scope of the invention.

The light source 1206 may comprise one or more devices or a system that produces suitable light 1220. In the preferred embodiment, the light source 1206 comprises an array of light-emitting diodes (LEDs). In this embodiment, different LEDs within the array may be used to produce different colors of light 1220, including infrared light. In particular, specific colors of LEDs can be controlled to produce short duration pulses of light 1220. In another embodiment, the light source 1206 comprises a broad spectrum light source 1206, such as a fluorescent, incandescent, tungsten-halogen, direct gas discharge lamps, and the like. In this embodiment, the sensor system 1204 may include filters for spectrally separating the colors of light 1220 from the film 606. For example, as described below, a RGB filtered trilinear array of detectors may be used to spectrally separate the light 1220 from the film 606. In another embodiment of a broad-spectrum light source, the light source 1206 includes a filter, such as a color wheel, to produce the specified colors of light 1220. In yet another embodiment, the light source 1206 comprises a point light source, such as a laser. For example, the point light source may be a gallium arsenide or an indium gallium phosphide laser. In this embodiment, the width of the laser beam is preferably the same size as a pixel on the film 606 (~12 microns). Filters, such as a color wheel, or other suitable wavelength modifiers or limiters maybe used to provide the specified color or colors of light 1220.

Optional optics 1208 for the lighting system 1202 directs the light 1220 to the film 606. In the preferred embodiment, the optics 1208 comprises a waveguide that directs the light 1220 onto the film 606. In other embodiment, the optics 1220 includes a lens system for focusing the light 1220. In a particular embodiment, the lens system includes a polarizing filter to condition the light 1220. The optics 1208 may also include a light baffle 1222a. The light baffle 1222a constrains illumination of the light 1220 within a scan area in order to reduce light leakage that could cause fogging of the film 606. In one embodiment, the light baffle 1222a comprises a coated member adjacent the film 606. The coating is generally a light absorbing material to prevent reflecting light 1220 that could cause fogging of the film 606.

The detector 1210 comprises one or more photodetectors that convert light 1220 from the film 606 into data signals 616. In the preferred embodiment, the detector 1210 comprises a linear charge coupled device (CCD) array. In another embodiment, the detector 1210 comprises an area array. The detector 1210 may also comprise a photodiode, phototransistor, photoresistor, and the like. In addition, the detector 1210 may utilize time delay integration (TDI) to improve the accuracy detector 1210. The detector 1210 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 1220. Other suitable types of filters maybe used. For example, a hot mirror and a cold mirror can be used to separate infrared light from visible light.

Optional optics 1212 for the sensor system 1204 directs the light 1220 from the film 606 onto the detector 1210. In the preferred embodiment, the optics 1212 comprises a lens system that directs the light 1220 from the film 606 onto the detector 1210. In a particular embodiment, the optics 1212 include polarized lenses. The optics 1212 may also include a light baffle 1222b. The light baffle 1222b is similar in function to light baffle 1222a to help prevent fogging of the film 606.

As discussed previously, individual scanning stations 1200 may have different architectures. For example, light 1220 sensed by the sensor system 1204 may be transmitted light or reflected light. Light 1220 reflected from the film 606 is generally representative of the emulsion layer on the same side of the film 606 as the sensor system 1204. Specifically, light 1220 reflected from the front side (emulsion side) of the film 606 represents the blue sensitive layer and light 1220 reflected from the back side of the film 606 represents the red sensitive layer. Light 1220 transmitted through the film 606 collects information from all layers of the film 606. Different colors of light 1220 are used to measure different characteristics of the film 606. For example, visible light interacts with the dye image and silver within the film 606, and infrared light interacts with the silver in the film 606.

Different architectures and embodiments of the scanning station 1200 may scan the film 606 differently. In particular, the lighting system 1202 and sensor system 1204 operate in concert to illuminate and sense the light 1220 from the film 606 to produce suitable sensor data 616. In one embodiment, the lighting system 1202 separately applies distinct colors of light 1220 to the film 606. In this embodiment, the sensor system 1204 generally comprises a non-filtered detector 1210 that measures in series the corresponding colors of light 1220 from the film 606. In another embodiment, multiple unique color combinations are simultaneously applied to the film 606, and individual color records are derived from the sensor data 616. In another embodiment, the lighting system 1202 simultaneously applies multiple colors of light 1220 to the film 606. In this embodiment, the sensor system 1204 generally comprises a filtered detector 1210 that allows the simultaneous measurement of individual colors of light 1220. Other suitable scanning methods may be used to obtain the required color records.

The use of the processing station 722 may improve the scanning properties of the film 606 in addition to retarding or substantially stopping the continued development of the film 606. For example, the amount of light 1220 transmitted through the film 606 is negatively effected by the opacity of the film 606. In other words, the greater the opacity of the film 606 the lower the amount of light 1220 transmitted through the film 606. Both the silver image and silver halide within the film 606 occlude light 1220. On the whole, the silver image within the film 606 absorbs light 1220, and the silver halide reflects light 1220. As described above, the processing solutions 824 may be used to modify opacity of the film 606 and improve the scanning properties of the film 606.

Specific examples of scanner station 1200 architectures are illustrated in FIGS. 13–18. The scanning system 624 may comprise any illustrated example, combination of examples, or other suitable methods or systems for scanning the film 606 without departing from the scope and spirit of the invention.

FIG. 13 is a schematic diagram illustrating a scanning station 1200a having a transmission architecture. As illustrated, the transmission scanning station 1200a comprises a lighting system 1202a and a sensor system 1204a. Lighting system 1202a produces light 1220a that is transmitted through the film 606 and measured by the sensor system 1204a. The sensor system 1204a produces sensor data 616a that is communicated to the data processing system 602.

Lighting system 1202a and sensor system 1204a are similar in design and function as lighting system 1202 and sensor system 1204, respectively. The visible light 1220a may comprise broadband visible light, individual visible light colors, or combinations of visible light colors. In an embodiment in which the light 1220a comprises broadband visible light, the sensor system 1204a will preferably comprise a red, green and blue trilinear array. In this embodiment, the sensor system 1204a can simultaneously measure the red, green and blue components of light 1220a from the film 606. In another embodiment, the light 1220a comprises pulses of red, green and blue light, and the sensor system 1204a preferably comprises an unfiltered detector operable to measure the pulses of light 1220a from the film 606. In this embodiment, the color of the light 1220a changes and the sensor system 1204a measures the respective light pulses from the film 606.

In one embodiment of the scanning station 1200a, the light 1220a produced by the lighting system 1202a comprises visible light. The visible light 1220a interacts with at least one dye cloud within the film 606 and any silver occlusions contained in the film 606. In particular, depending upon the embodiment of the development system 622, the film 606 may include silver forming an optical occlusion, such as metallic silver grains, silver halide, or both, but does not include silver compounds formed as a result of fixing the silver halide contained within the film 606.

The visible light 1220a interacts with the magenta, cyan and yellow dye images within the film 606, as well as any silver occlusions within the film 606, the sensor system 1204a records the intensity of visible light 1220a from the film 606 and produces sensor data 616a. The sensor data 616a generally comprises a red, green, and blue record corresponding to the cyan, magenta, and yellow dye images, respectively. Depending upon the development process, each of the red, green, and blue records may include a silver record. Specifically, any metallic silver grains or silver halide within the film 606 partially occludes the visible light 1220a transmitted through the film 606. Depending upon the severity of the occlusions, the red, green, and blue records are processed by the data processing system 602 to correct for the occlusion in the film 606.

In the preferred embodiment of the transmission scanning station 1200a, the light 1220a produced by the lighting system 1202a comprises visible light and infrared light. As discussed above, the visible light may comprise broadband visible light, individual visible light colors, or combinations of visible light colors. The infrared light may comprise infrared, near infrared, or any suitable combination thereof. The visible light 1220a interacts with the dye images, i.e. cyan, magenta, or yellow, within the film 606 and any silver to produce a red, green, and/or blue record that includes a silver record. The infrared light interacts with the silver, and any other occlusions, within the film 606 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled System and Method for Image Recovery, which is hereby incorporated herein by reference. In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 1200a, the light produced by the lighting system 1202a comprises only infrared and/or near infrared light. In this embodiment, the infrared light 1220a interacts with occlusions within the film 606 but does not substantially interact with the dye images within the film 606. In this embodiment, the sensor data 616a does not spectrally distinguish the magenta, cyan, and yellow dye images. An advantage of this embodiment is that the infrared light 1220a does not fog the film 606. In a particular embodiment, the advantage of not fogging the film 606 allows the film 606 to be scanned at multiple development times without significantly fogging the film 606. In this embodiment, the scanning station 1200a can be used to determine the optimal development time for the film 606. This embodiment may also be used to scan the silver image.

FIG. 14 is a schematic diagram illustrating a scanning station 1200b having a reflection architecture. The reflective scanning station 1200b comprises a lighting system 1202b and a sensor system 1204b. Lighting system 1202b produces light 1220b that is reflected from the film 606 and measured by the sensor system 1204b. The scanning station 1200b generally requires silver halide to be present within the film 606. The silver halide scatters and reflects the light 1220b measured by the sensor system 1204b. The sensor system 1204b produces sensor data 616b that is communicated to the data processing system 602. Lighting system 1202b and sensor system 1204b are similar to lighting system 1202 and sensor system 1204, respectively.

In one embodiment of the reflective scanning station 1200b used to scan the blue emulsion layer of the film 606, the light 1220b produced by the lighting system 1202b comprises blue light. In this embodiment, the blue light 1220b scans the silver and dye image within the blue layer of the film 606. The blue light 1220b interacts with the yellow dye image and also the silver in the blue emulsion layer. In particular, the blue light 1220b is reflected from the silver halide and measured by the sensor system 1204b to produce a blue record. Many conventional films 806 include a yellow filter below the blue emulsion layer that blocks the blue light 1220a from illuminating the other emulsion layers of the film 606. As a result, noise created by cross-talk between the blue emulsion layer and the red and green emulsion layers is substantially reduced.

In another embodiment of the reflective scanning station 1200b used to scan the blue emulsion layer of the film 606, the light 1220b produced by the lighting system 1202b comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 606. In this embodiment, the non-blue light 1220b interacts with the silver image in the blue emulsion layer of the film 606, but is transparent to the yellow dye within the blue emulsion layer of the film 606. This embodiment is prone to higher noise levels created by cross-talk between the blue and green emulsion layers of the film 606.

In yet another embodiment of the reflective scanning station 1200b, the light 1220b produced by the lighting system 1202b comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 606. In this embodiment, the sensor system 1204*b* generally comprises a filtered detector 1210*b* (not expressly shown) that measures the red, green, blue, and infrared light 1220*b* from the film 606 to produce red, green, blue, and infrared records as sensor data 616*b*.

Although the scanning station 1200*b* is illustrated with the lighting system 1202*b* and the sensor system 1204*b* located on front side of the film 606, the lighting system 1202*b* and the sensor system 1204*b* may also be located on the back side of the film 606. In this embodiment, the light 1220*b* produced by the lighting system 1202*b* may comprise red light. The red light largely interacts with the cyan dye image and silver in the red emulsion layer of the film 606 to produce a red record of the sensor data 616*b*.

FIG. 15 is a schematic diagram illustrating a scanning station 1200*c* having a transmission-reflection architecture. The transmission-reflection architecture is the preferred embodiment of the scanning system 624. In this embodiment, the scanning station 1200*c* comprises a first lighting system 1202*c*, a second lighting system 1202*d*, and a sensor system 1204*c*. In the preferred embodiment, the lighting system 1202*c* operates to illuminate the front side of the film 606 with light 1220*c*, the second lighting system 1202*d* operates to illuminate the backside of the film 606 with light 1220*d*, and the sensor system 1204*c* operates to measure the light 1220*c* reflected from the film 606 and the light 1220*d* transmitted through the film 606. Based on the measurements of the light 1220*b*, 1220*d*, the sensor system 1204*c* produces sensor data 616*c* that is communicated to the data processing system 602. Lighting system 1202*c* and 1202*d* are similar to lighting system 1202, and sensor system 1204*c* is similar to the sensor system 1204. Although scanning station 1200*c* is illustrated with lighting systems 1202*c*, 1202*d*, a single light source may be used to produce light that is directed through a system of mirrors, shutters, filters, and the like, to illuminate the film 606 with the front side of the film 606 with light 1220*c* and illuminate the back side of the film 606 with light 1220*d*. The light 1220*c*, 1220*d* may comprise any color or color combinations, including infrared light.

This embodiment of the scanning station 1200*c* utilizes many of the positive characteristics of the transmission architecture scanning station 1200*a* and the reflection architecture scanning station 1200*b*. For example, the blue emulsion layer is viewed better by light 1220*c* reflected from the film 606 than by light 1220*d* transmitted through the film 606; the green emulsion layer is viewed better by light 1220*d* transmitted through the film 606 than by light 1220*c* reflected from the film 606; and the red emulsion layer is adequately viewed by light 1220*d* transmitted through the film 606. In addition, the cost of the scanning station 1200*c* is minimized through the use of a single sensor system 1204*c*.

In the preferred embodiment of the scanning station 1200*c*, the light 1220*c* comprises blue light, and light 1220*d* comprises red, green, and infrared light. The blue light 1220*c* interacts with the yellow dye image and silver in the blue emulsion layer of the film 606. The sensor system 1204*c* measures the light 1220*c* from the film 606 and produces a blue-silver record. The red and green light 1220*d* interacts with the cyan and magenta dye images, respectively, as well as the silver in the film 606. The infrared light 1220*d* interacts with the silver, but does not interact with the dye clouds within the film 606. As discussed previously, the silver contained within the film 606 may comprise silver grains, silver halide, or both. The red, green, and infrared light 1220*d* transmitted through the film 606 is measured by the sensor system 1204*c*, which produces a red-silver, green-silver, and silver record. The blue-silver, red-silver, green-silver, and silver records form the sensor data 616*c* that is communicated to the data processing system 602. The data processing system 602 utilizes the silver record to facilitate removal of the silver component from the red, green, and blue records.

In another embodiment, the light 1220*c* comprises blue light and infrared light, and light 1220*d* comprises red, green, and infrared light. As discussed previously, the blue light 1220*c* mainly interacts with the yellow dye image and silver within the blue emulsion layer of the film 606. The infrared light 1220*c* interacts with mainly the silver in the blue emulsion layer of the film 606. The sensor system 1204*c* measures the blue and infrared light 1220*c* from the film 606 and produces a blue-silver record and a front side silver record, respectively. The red, green, and infrared light 1220*d* interact with the film 606 and are measured by the sensor system 1204*c* to produce red-silver, green-silver and transmitted-silver records as discussed above. The blue-silver, red-silver, green-silver, and both silver records form the sensor data 616*c* that is communicated to the data processing system 602. In this embodiment, the data processing system 602 utilizes the front side silver record of the blue emulsion layer to facilitate removal of the silver component from the blue-silver record, and the transmission-silver record is utilized to facilitate removal of the silver component from the red and green records.

Although the scanning station 1200*c* is described in terms of specific colors and color combinations of light 1220*c* and light 1220*d*, the light 1220*c* and light 1220*d* may comprise other suitable colors and color combinations of light without departing from the scope of the invention. For example, light 1220*c* may comprise non-blue light, infrared light, broadband white light, or any other suitable light. Likewise, light 1220*d* may include blue light, broadband white light, or another other suitable light. Scanning station 1200*c* may also comprise other suitable embodiments without departing from the scope of the invention. For example, although the scanning station 1200*c* is illustrated with two lighting systems 1202 and a single sensor system 1204, the scanning station 1200*c* could be configured with a single lighting system 1202 and two sensor systems 1204, wherein one sensor system measures light 1220 reflected from the film 606 and the second sensory system 1204 measures light 1220 transmitted through the film 606. In addition, as discussed above, the scanning station 1200 may comprise a single lighting system that illuminates the film 606 with light 1220*c* and light 1220*d*.

FIG. 16 is a schematic diagram illustrating a scanning station 1200*d* having a reflection-transmission-reflection architecture. In this embodiment, the scanning station 1200*d* comprises a first lighting system 1202*e*, a second lighting system 1202*f*, a first sensor system 1204*e*, and a second sensor system 1204*f*. In the embodiment illustrated, the lighting system 1202*e* operates to illuminate the front side of the film 606 with light 1220*e*, and the second lighting system 1202*f* operates to illuminate the back side of the film 606 with light 1220*f*. The first sensor system 1204*e* operates to measure the light 1220*e* reflected from the film 606 and the light 1220*f* transmitted through the film 606, and the second sensor system 1204*f* operates to measure the light 1220*f* reflected from the film 606 and the light 1220*e* transmitted through the film 606. Based on the measurements of the light 1220*e* and 1220*f*, the sensor systems 1204*e*, 1204*f* produce sensor data 616*ef* that is communicated to the data processing system 602. Lighting systems 1202e, 1202f are similar to lighting systems 1202, and sensor systems 1204e, 1204f are similar to the sensor system 1204. Although scanning station 1200d is illustrated with lighting systems 1202e, 1202f, and sensor systems 1204e, 1204f, a single lighting system and/or sensory system, respectively, may be used to produce light that is directed through a system of mirrors, shutters, filters, and the like, to illuminate the film 606 with the frontside of the film 606 with light 1220e and illuminate the backside of the film 606 with light 1220f.

This embodiment of the scanning station 1200d expands upon the positive characteristics of the transmission-reflection architecture of scanning station 1200c. For example, as discussed in reference to FIG. 15, the blue emulsion layer is viewed better by light 1220e reflected from the film 606 and the green emulsion layer is viewed better by light 1220e or 1220f transmitted through the film 606. Second sensor system 1204f allows viewing of the red emulsion layer by light 1220f reflected from the film 606, which generally produces better results than viewing the red emulsion layer by light 1220e or light 1220f transmitted through the film 606.

In one embodiment of the scanning station 1200d, the light 1220e and 1220f comprises light within the infrared portion of the electromagnetic spectrum. In this embodiment, the sensor system 1204e measures light 1220e reflected from the front emulsion layer and light 1220f transmitted through the film 606. The sensor system 1204f measures light 1220f reflected from the back emulsion layer and light 1220e transmitted through the film 606. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 1200d, the sensor systems 1204e, 1204f include a trilinear array of filtered detectors, and the light 1220e and the light 1220f comprises broadband white light and infrared light. The trilinear array operates to simultaneously measure the individual red, green, and blue components of the broadband white light 1220e, 1220f. The infrared light is measured separately and can be measured through each filtered detector 1210 of the sensor systems 1204e, 1204f. The broadband white light 1220e, 1220f interacts with the silver and magenta, cyan, and yellow color dyes in the film 606, respectively, and the infrared light 1220e, 1220f interacts with the silver within the film 606. The reflected white light 1220e measured by the first sensor system 1204e includes information corresponding to the yellow dye image and the silver in the blue emulsion layer of the film 606. In particular, the blue component of the broadband white light 1220e measured by the blue detector of the sensor system 1204e corresponds to the yellow dye image, and the non-blue components of the broadband white light 1220e measured by the red and green detectors corresponds to the red and green dye images and all the silver within the emulsion layers of the film 606. Similarly, the red component of the broadband white light 1220f measured by the red detector of the sensor system 1204f corresponds largely to the cyan dye image, and the non-red components of the broadband white light 1220e measured by the blue and green detectors corresponds to the yellow and magenta dye images and all the silver within the emulsion layers of the film 606. The white light 1220e, 1220f transmitted through the film 606 interacts with each color dye image and silver within the film 606, and the red, green, and blue light components are measured by the red, green, and blue detectors of the sensor systems 1204e, 1204f to produce individual red, green and blue light records that include the silver record. The infrared light 1220e reflected from the film 606 and measured by the sensor system 1204e corresponds largely to the silver in the blue emulsion layer of the film 606, and the infrared light 1220f reflected from the film 606 and measured by the sensor system 1204f largely corresponds to the silver in the red emulsion layer of the film 606. The infrared light 1220e, 1220f transmitted through the film 606 measured by the sensor systems 1204e, 1204f corresponds to the silver in the red, green, and blue emulsion layers of the film 606. The individual measurements of the sensor systems 1204e, 1204f are communicated to the data processing system 602 as sensor data 616ef. The data processing system 602 processes the sensor data 616ef and constructs the digital image 608 using the various sensor system measurements. For example, the blue signal value for each pixel can be calculated using the blue detector data from the reflected light 1220e and the blue detector data from the transmitted light 1220f, as modified by non-blue detector data from the reflected light 1220e, and the non-blue detector data from the transmitted light 1220e or 1220f. The red and green signal values for each pixel can be similarly calculated using the various measurements.

In another embodiment of the scanning station 1200d, the sensor systems 1204e, 1204f include a trilinear array of filtered detectors, and the light 1220e and the light 1220fcomprises broadband white light. This embodiment of the scanning station 1200d operates in a similar manner as discussed above, with the exception that infrared light is not measured or used to calculate the digital image 608.

Although the scanning station 1200d is described in terms of a specific colors and color combinations of light 1220e and light 1220f, the light 1220e and light 1220f may comprise other suitable colors and color combinations of light without departing from the scope of the invention. Likewise, the scanning station 1200d may comprise other suitable devices and systems without departing from the scope of the invention.

In the previous detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. The previous detailed description is, therefore, not to be taken in a limiting sense, and the scope of the present invention is defined only by the appended claims.

What is claimed is:

1. A method comprising;
    obtaining a base signal including a plurality of signal components;
    performing a pyramidal decomposition of the base signal to generate a first decomposed signal;
    increasing the ratio of a desired signal component of the first decomposed signal to other signal components of the first decomposed signal to generate a first modified signal; and recomposing the first modified signal to generate an improved base signal.

2. The method as in claim 1, wherein increasing the ratio includes increasing the desired signal component.

3. The method as in claim 2, wherein increasing the desired signal component is performed by guiding a sheep artifact with a shepherd artifact.

4. The method as in claim 1, wherein increasing the ratio includes filtering the other signal components.

5. The method as in claim 4, wherein filtering is includes using a match blur.

6. The method as in claim 4, wherein filtering includes streak removal.

7. The method as in claim 1, further including:
performing a pyramidal decomposition of the first modified signal to generate a second decomposed signal;
increasing the ratio of a desired signal component of the second decomposed signal to other signal components of the second decomposed signal to generate a second modified signal; and
recomposing the modified second decomposed signal to generate a first recomposed signal.

8. The method as in claim 7, further including:
combining the first recomposed signal with the second modified signal to generate a first improved signal.

9. The method as in claim 7, further including:
combining the first recomposed signal with the second decomposed signal to generate a first improved signal.

10. The method as in claim 1, wherein said base signal is a digital representation of an analog signal.

11. A method comprising;
obtaining a digital base image, the base image including a plurality of image components;
performing a first pyramidal decomposition of the base image to generate a first decomposed image;
increasing the ratio of a desired image component of the first decomposed image to other image components of the first decomposed image to generate a first modified image;
performing a pyramidal decomposition of the first modified image to generate a second decomposed image;
increasing the ratio of a desired image component of the second decomposed image to other image components of the second decomposed image to generate a second modified image;
recomposing the second modified image to generate a first recomposed image;
combining the first recomposed image with the first modified image to generate an improved first image;
recomposing the improved first image to generate an improved base image.

12. The method as in claim 11, wherein increasing the ratio includes increasing the desired image component.

13. The method as in claim 12, wherein increasing the desired image component is performed by guiding a sheep artifact with a shepherd artifact.

14. The method as in claim 11, wherein increasing the ratio includes filtering the other image components.

15. The method as in claim 14, wherein filtering is includes using a match blur.

16. The method as in claim 15, wherein filtering includes streak removal.

17. A digital film development system comprising:
a film processing system, said film processing system including an image capturing station capable of obtaining sets of data representing an image formed in film; and
a data processing system, said data processing system including:
a processor;
memory operably coupled to said processor; and
a program of instructions capable of being stored in said memory and executed by said processor, said program of instructions including instructions for:
obtaining a base signal including a plurality of signal components;
performing a pyramidal decomposition of the base signal to generate a first decomposed signal;
increasing the ratio of a desired signal component of the first decomposed signal to other signal components of the first decomposed signal to generate a first modified signal; and
recomposing the first modified signal to generate an improved base signal.

18. The method as in claim 17, wherein increasing the ratio includes increasing the desired signal component.

19. The method as in claim 18, wherein increasing the desired signal component is performed by guiding a sheep artifact with a shepherd artifact.

20. The method as in claim 17, wherein increasing the ratio includes filtering the other signal components.

21. The method as in claim 20, wherein filtering is includes using a match blur.

22. The method as in claim 20, wherein filtering includes streak removal.

23. The method as in claim 17, further including:
performing a pyramidal decomposition of the first modified signal to generate a second decomposed signal;
increasing the ratio of a desired signal component of the second decomposed signal to other signal components of the second decomposed signal to generate a second modified signal; and
recomposing the modified second decomposed signal to generate an improved first decompose a first recomposed signal.

24. The method as in claim 23, further including:
combining the first recomposed signal with the second modified signal to generate a first improved signal.

25. The method as in claim 23, further including:
combining the first recomposed signal with the second decomposed signal to generate a first improved signal.

26. The method as in claim 1, wherein said base signal is a digital representation of an analog signal.

27. A digital image tangibly embodied in a computer readable medium, said digital image generated according to a method comprising:
obtaining a digital base image, the base image including a plurality of image components;
performing a first pyramidal decomposition of the base image to generate a first decomposed image;
increasing the ratio of a desired image component of the first decomposed image to other image components of the first decomposed image to generate a first modified image;
performing a pyramidal decomposition of the first modified image to generate a second decomposed image;
increasing the ratio of a desired image component of the second decomposed image to other image components of the second decomposed image to generate a second modified image;
recomposing the second modified image to generate an improved first first recomposed image;

combining the first recomposed image with the first modified image to generate an improved first image;

recomposing the improved first image to generate an improved base image.

28. The digital image as in claim 27, wherein increasing the ratio includes increasing the desired image component.

29. The digital image as in claim 28, wherein increasing the desired image component is performed by guiding a sheep artifact with a shepherd artifact.

30. The digital image as in claim 28, wherein increasing the ratio includes filtering the other image components.

31. The digital image as in claim 30, wherein filtering is includes using a match blur.

32. The digital image as in claim 30, wherein filtering includes streak removal.

* * * * *